United States Patent
Sakhnini et al.

(10) Patent No.: US 12,150,134 B2
(45) Date of Patent: Nov. 19, 2024

(54) MASTER INFORMATION BLOCK AND DOWNLOAD CONTROL INFORMATION DESIGN FOR HIGHER BANDS

(71) Applicant: QUALCOMM Incorporated, San Diego, CA (US)

(72) Inventors: Iyab Issam Sakhnini, San Diego, CA (US); Tao Luo, San Diego, CA (US); Xiaoxia Zhang, San Diego, CA (US); Jing Sun, San Diego, CA (US); Juan Montojo, San Diego, CA (US); Junyi Li, Franklin Park, NJ (US); Sony Akkarakaran, Poway, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 324 days.

(21) Appl. No.: 17/145,182

(22) Filed: Jan. 8, 2021

(65) Prior Publication Data
US 2022/0225296 A1    Jul. 14, 2022

(51) Int. Cl.
*H04W 72/04* (2023.01)
*H04W 56/00* (2009.01)
*H04W 72/23* (2023.01)

(52) U.S. Cl.
CPC .......... *H04W 72/23* (2023.01); *H04W 56/00* (2013.01)

(58) Field of Classification Search
CPC ... H04W 72/042; H04W 56/00; H04W 48/16; H04W 72/1294; H04W 72/1289; H04W 48/12
See application file for complete search history.

(56) References Cited

U.S. PATENT DOCUMENTS

| | | | | |
|---|---|---|---|---|
| 10,009,882 B2* | 6/2018 | You | ...................... | H04L 5/0091 |
| 11,855,732 B2* | 12/2023 | Kim | ...................... | H04L 5/005 |
| 2015/0092655 A1* | 4/2015 | Liao | ...................... | H04L 5/0007 370/312 |
| 2018/0192383 A1 | 7/2018 | Nam et al. | | |
| 2019/0132170 A1 | 5/2019 | Si et al. | | |
| 2019/0215101 A1* | 7/2019 | Ko | ...................... | H04L 1/1819 |
| 2020/0059891 A1* | 2/2020 | Huang | ................. | H04W 72/23 |
| 2020/0154396 A1* | 5/2020 | Liu | ...................... | H04W 72/30 |
| 2021/0007066 A1* | 1/2021 | Lin | ...................... | H04L 5/005 |
| 2021/0029678 A1* | 1/2021 | Liu | ...................... | H04L 5/0053 |

(Continued)

FOREIGN PATENT DOCUMENTS

WO    2019140258 A1    7/2019

OTHER PUBLICATIONS

International Search Report and Written Opinion—PCT/US2021/064187—ISA/EPO—Apr. 14, 2022.

(Continued)

*Primary Examiner* — Hoang-Chuong Q Vu
(74) *Attorney, Agent, or Firm* — Procopio, Cory, Hargreaves & Savitch LLP

(57) ABSTRACT

Aspects presented herein may enable a base station to transmit information associated with PBCH/MIB and information associated with DCI in a combined block to enhance the initial access procedure for a UE. In one aspect, a base station transmits a combined block comprising a synchronization signal and information scheduling a SIB1 PDSCH. The base station transmits the SIB1 PDSCH based on the information.

24 Claims, 21 Drawing Sheets

(56) References Cited

U.S. PATENT DOCUMENTS

| | | | |
|---|---|---|---|
| 2021/0136663 A1* | 5/2021 | Liu | H04W 48/12 |
| 2021/0168699 A1* | 6/2021 | Luo | H04L 5/0053 |
| 2021/0168703 A1* | 6/2021 | Luo | H04W 4/70 |
| 2021/0218503 A1* | 7/2021 | Babaei | H04L 1/1861 |
| 2021/0250752 A1* | 8/2021 | Tsai | H04W 8/24 |
| 2021/0274562 A1* | 9/2021 | Takeda | H04W 56/001 |
| 2021/0321408 A1* | 10/2021 | Taherzadeh Boroujeni | H04W 72/53 |
| 2021/0328700 A1* | 10/2021 | Hu | H04W 48/16 |
| 2021/0329718 A1* | 10/2021 | Hu | H04W 72/042 |
| 2022/0046385 A1* | 2/2022 | Sundararajan | H04W 4/023 |
| 2022/0060992 A1* | 2/2022 | Xue | H04W 52/0235 |
| 2022/0070897 A1* | 3/2022 | Hwang | H04L 1/1854 |
| 2022/0078728 A1* | 3/2022 | Yi | H04W 72/1263 |
| 2022/0086867 A1* | 3/2022 | Papasakellariou | H04L 5/0044 |
| 2022/0150800 A1* | 5/2022 | Harada | H04W 72/0446 |
| 2022/0183079 A1* | 6/2022 | Ouchi | H04W 74/0841 |
| 2022/0330133 A1* | 10/2022 | Chen | H04W 36/08 |
| 2022/0353793 A1* | 11/2022 | Gao | H04W 48/16 |
| 2023/0053250 A1* | 2/2023 | Kim | H04W 48/08 |
| 2023/0353332 A1* | 11/2023 | Wu | H04L 27/261 |

OTHER PUBLICATIONS

Nokia, et al., "Initial Access for REDCAP UEs", 3GPP Draft, 3GPP TSG-RAN WG1 Meeting #103-e, R1-2008072, 3rd Generation Partnership Project (3GPP), vol. RAN WG1, No. e-Meeting, Oct. 26, 2020-Nov. 13, 2020, Oct. 16, 2020 (Oct. 16, 2020), XP051939452, 6 Pages, Retrieved from the Internet: URL: https://ftp.3gpp.org/tsg_ran/WG1_RL1/TSGR1_103-e/Docs/R1-2008072.zip R1-2008072_Initial_Access_for_REDCAP_UEs.doc [Retrieved on Oct. 16, 2020] p. 4, paragraph 2.2, table 2.

* cited by examiner

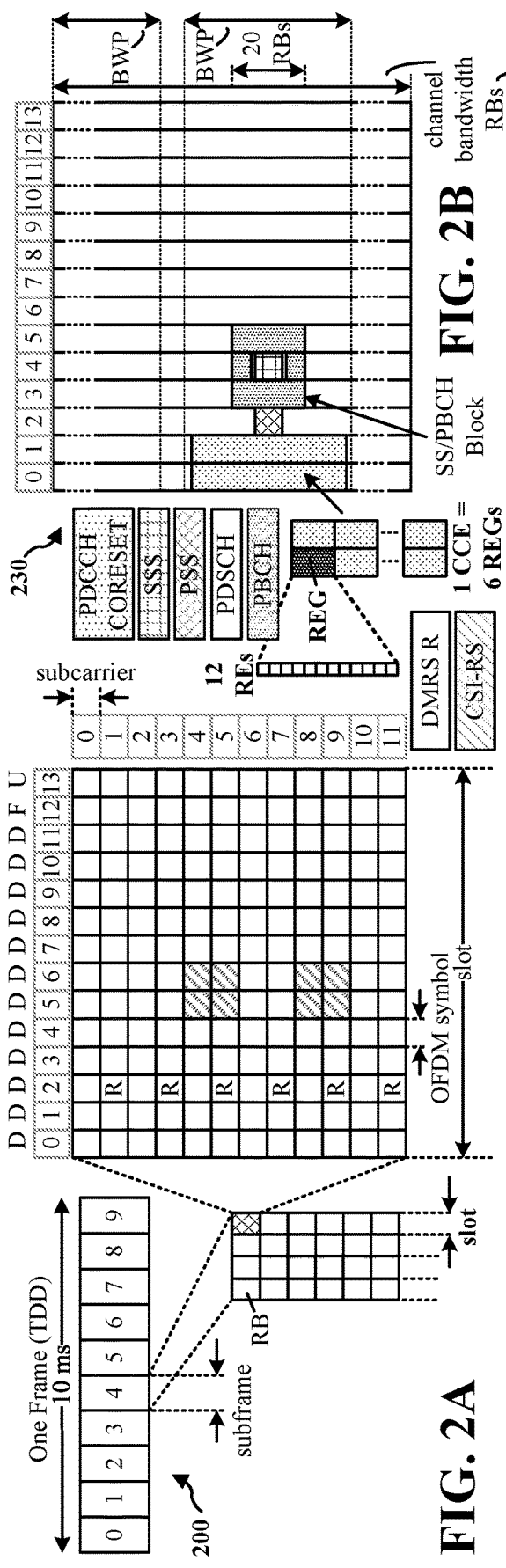
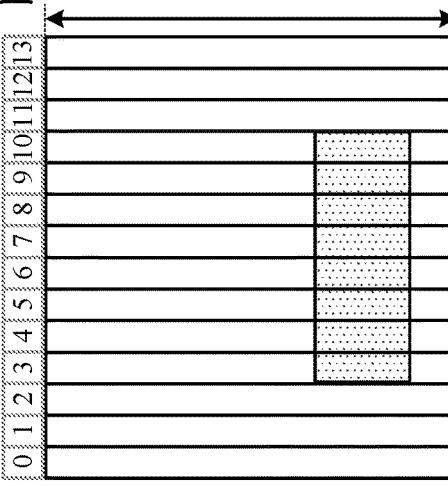
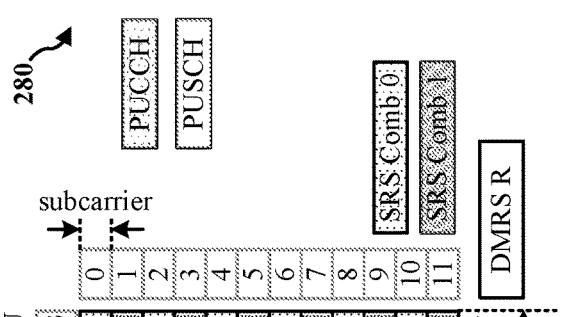
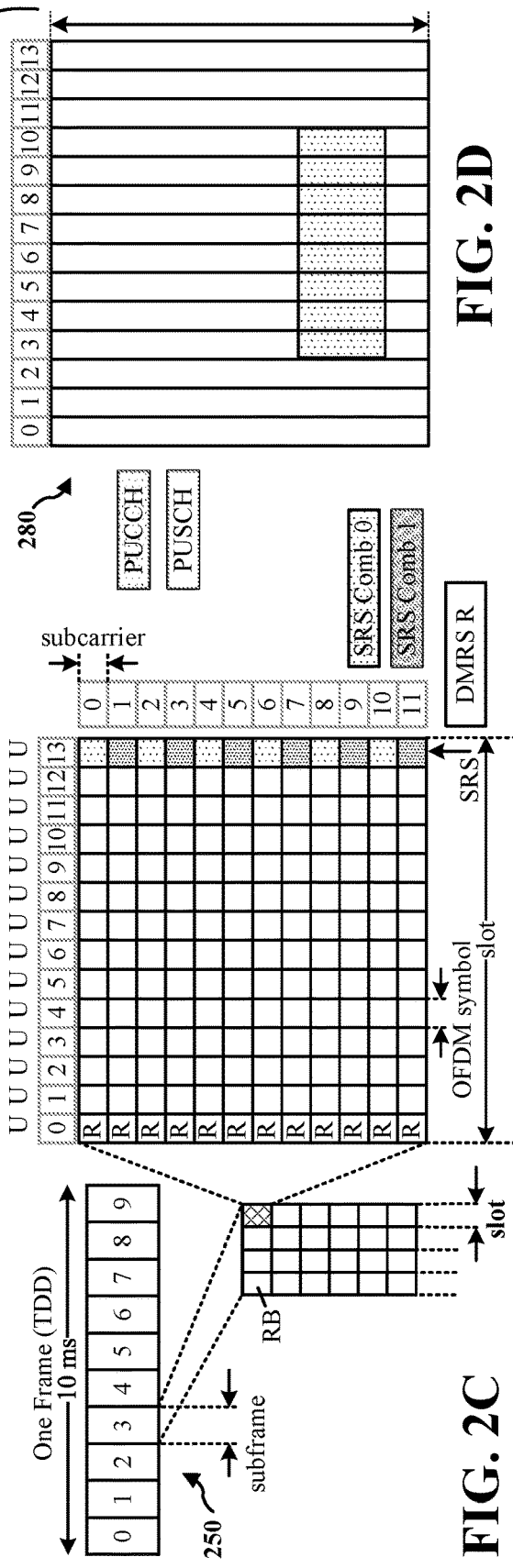
FIG. 2A
FIG. 2B
FIG. 2C
FIG. 2D

| FIELD | # of Bits | Comments |
|---|---|---|
| Frequency Domain Resource Allocation (FDRA) | 9, 11, 13 bits (for 24, 48, 96 RBs) | $[\log_2 (N_{RB}(N_{RB}+1)/2)]$, $N_{RB}$ = size of CORESET 0 |
| Time Domain Resource Allocation (TDRA) | 4 bits | |
| Virtual Resource Block (VRB)-to-Physical Resource Block (PRB) mapping | 1 bit | 0 = non-interleaved, 1 = interleaved |
| Modulation Coding Scheme (MCS) | 5 bits | |
| Redundancy Version (RV) | 2 bits | |
| System Information (SI) indicator | 1 bit | 0 = SIB1, 1 = SI message |
| Reserved | 15 bits | |

DCI 602 : 37, 39, or 41 bits

| u | 0 | 1 | 2 | 3 | 4 | 5 | 6 | 7 | 8 |
|---|---|---|---|---|---|---|---|---|---|
| SCS (KHz) | 15 | 30 | 60 | 120 | 240 | 480 | 960 | 1920 | 3840 |
| Tcp (ns) | 4687.5 | 2343.8 | 1171.9 | 585.9 | 293.0 | 146.5 | 73.2 | 36.6 | 18.3 |
| Tsymb (ns) | 66666.7 | 33333.3 | 16666.7 | 8333.3 | 4166.7 | 2083.3 | 1041.7 | 520.8 | 260.4 |

Combined MIB/PBCH/DCI
(e.g., initial access information message)
1402

| MIB | |
|---|---|
| SFN 1404 | 6 bits |
| Cell barred 1406 | 1 bit |
| IntraFreq Reselection 1408 | 1 bit |
| Spare 1410 | 1 bit |
| PBCH multiplexed bits in L1 | |
| SFN 1412 | 4 bits |
| Half-frame bit 1414 | 1 bit |
| MSB of SSB index 1416 | 3 bits |
| DCI | |
| FDRA 1418 | 9, 11, 13 bits |
| TDRA 1420 | 4 bits |
| MCS 1422 | 5 bits |
| RV 1424 | 2 bits |

FIG. 14

MASTER INFORMATION BLOCK AND DOWNLOAD CONTROL INFORMATION DESIGN FOR HIGHER BANDS

TECHNICAL FIELD

The present disclosure relates generally to communication systems, and more particularly, to wireless communication involving a master information block (MIB) and download control information (DCI).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a base station. The apparatus transmits a combined block comprising a synchronization signal and information scheduling a system information block 1 (SIB1) physical downlink shared channel (PDSCH). The apparatus transmits the SIB1 PDSCH based on the information.

In an aspect of the disclosure, a method, a computer-readable medium, and an apparatus are provided for wireless communication at a user equipment (UE). The apparatus receives a combined block from a base station, the combined block comprising a synchronization signal and information scheduling a SIB1 PDSCH. The apparatus receives the SIB1 PDSCH based on the information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIG. 6 is a diagram illustrating an example of information or parameters that may be included in DCI.

FIG. 7 is a table illustrating examples of OFDM symbol lengths and CP lengths for different SCSs.

FIG. 14 is a diagram illustrating an example of a combined channel or message according to aspects of the present disclosure.

DETAILED DESCRIPTION

Figure 1:
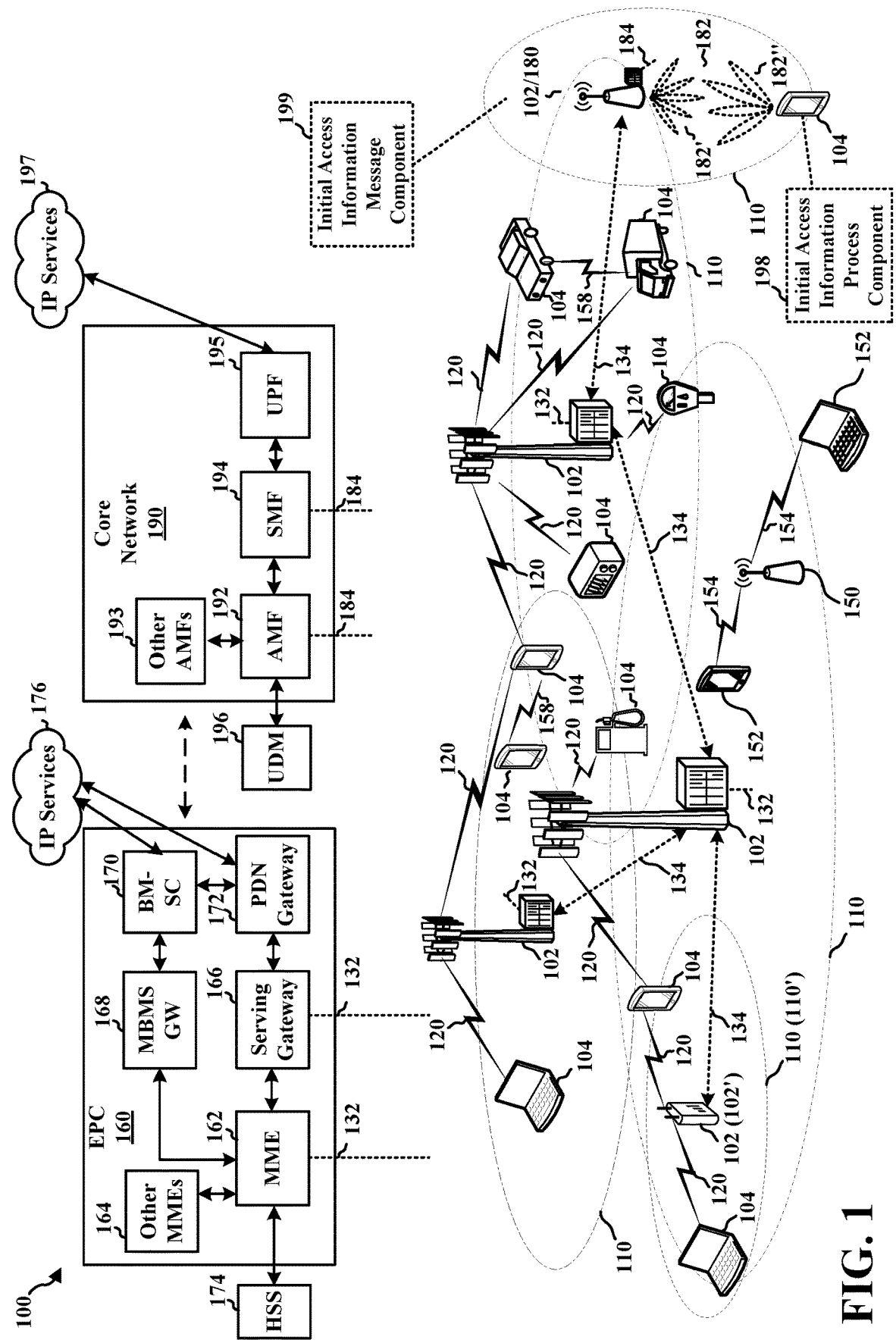
FIG. 1 is a diagram illustrating an example of a wireless communications system and an access network in accordance with aspects presented herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A UE may perform a cell search to obtain time and/or frequency synchronization with a cell (e.g., a base station) and to obtain a cell identifier (ID), such as physical layer cell ID (PCI) of the cell. The UE may also learn the signal quality and other information about the cell based on the PCI. The UE may perform the cell search for a defined frequency range before the UE selects or re-selects a cell. To perform the cell search, a UE may use/decode synchronization signal(s) transmitted from one or more cells, where the UE may obtain or derive information related to the one or more cells and/or their access information based on the synchronization signal(s). In one example, a cell may transmit one or more types of synchronization signals, such as a primary synchronization signal (PSS) and a secondary synchronization signal (SSS), along with physical broadcast channel (PBCH), in a synchronization signal/PBCH block (SSB) for reception by UEs within its transmission range. Thus, a UE may perform the cell search based on the SSB. In some examples, a UE may first decode PBCH before the UE may receive other system information transmitted on physical downlink shared channel (PDSCH).

A PBCH may include one or more parameters that may be used by a UE to decode a system information block type one (SIB1) message (e.g., SIB1 PDSCH). For example, the MIB within the PBCH may guide the UE to an initial control resource set (CORESET), e.g., CORESET zero (CORESET0), where the initial CORESET may carry a physical downlink control channel (PDCCH) that has information for scheduling a SIB1 PDSCH. The PDCCH within the CORESET0 may include a download control information (DCI) message, such as a DCI format 1_0. The DCI may be cyclic redundancy check (CRC) scrambled with the SI-RNTI, and the DCI may include information for scheduling the grant for the SIB1 PDSCH.

Aspects presented herein may enable a base station to transmit a single message/channel that carries both MIB information and DCI having similar coverage or size (e.g., number of bits for the message) as a separate MIB and DCI format 1_0 carrying information scheduling the grant for the SIB1 PDSCH, thereby improving the efficiency of wireless communication between the base station and the UE. In one aspect of the present disclosure, when a single carrier waveform is used for communication, a base station may eliminate or exclude one or more fields or parameters from an MIB and a DCI, such that the base station may transmit the MIB and the DCI to a UE in a single message/channel.

In certain aspects, the base station 102/180 may include an initial access information message component 199 configured to transmit information associated with PBCH/MIB and information associated with DCI in a combined block to enhance the initial access procedure for a UE. In one configuration, the initial access information message component 199 may be configured to transmit a combined block comprising a synchronization signal and information scheduling a SIB1 PDSCH. In such configuration, the initial access information message component 199 may transmit the SIB1 PDSCH based on the information.

In certain aspects, the UE 104 may include an initial access information process component 198 configured to receive information associated with PBCH/MIB and information associated with DCI in a combined block to enhance the initial access procedure for the UE 104. In one configuration, the initial access information process component 198 may be configured to receive a combined block from a base station, the combined block comprising a synchronization signal and information scheduling a SIB1 PDSCH. In such configuration, the initial access information process component 198 may receive the SIB1 PDSCH based on the information.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
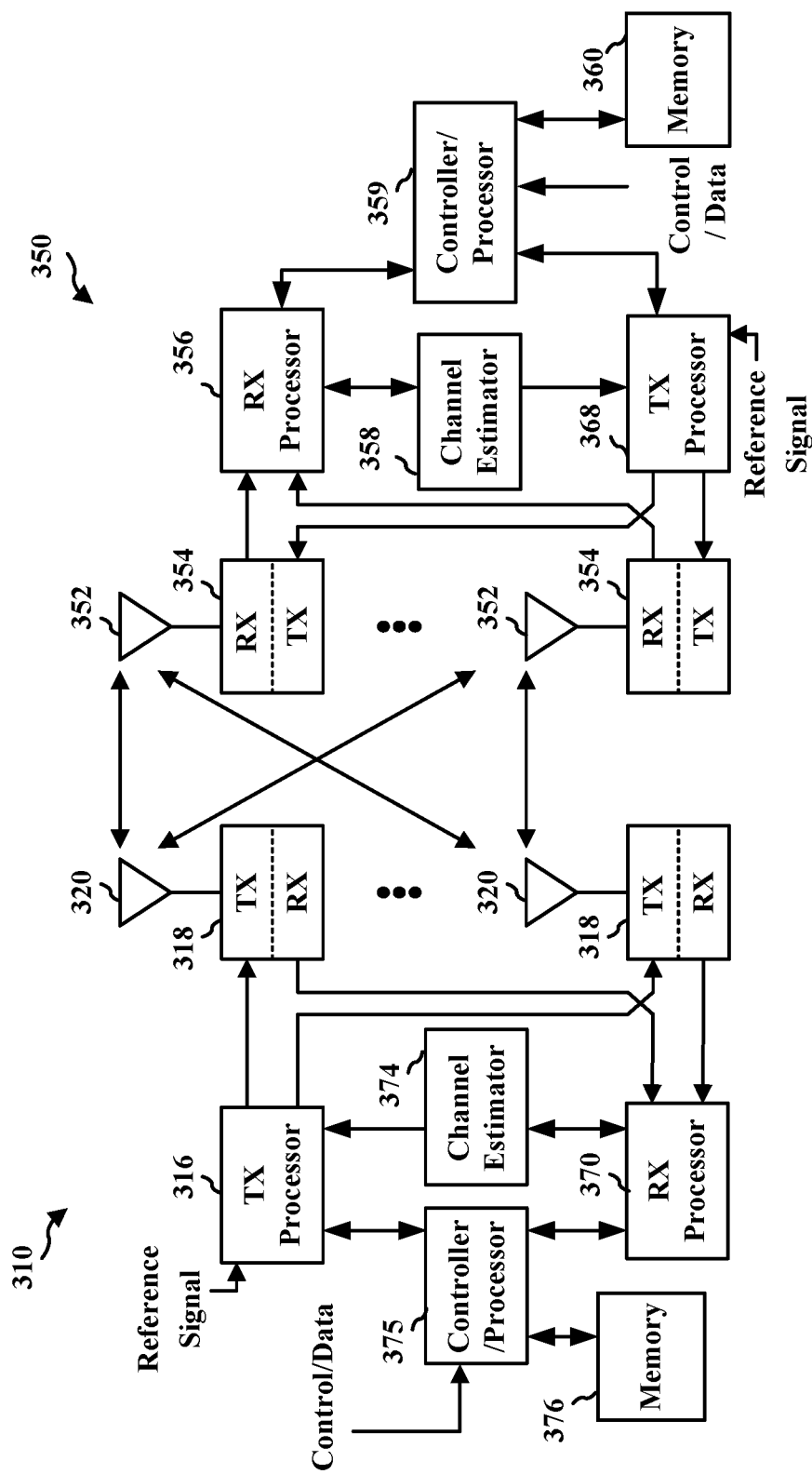
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the initial access information process component 198 of FIG. 1.

At least one of the TX processor 316, the RX processor 370, and the controller/processor 375 may be configured to perform aspects in connection with the initial access information message component 199 of FIG. 1.

A UE may perform a cell search to obtain time and/or frequency synchronization with a cell (e.g., a base station) and to obtain a cell identifier (ID), such as physical layer cell ID (PCI) of the cell. The UE may also learn the signal quality and other information about the cell based on the PCI. The UE may perform the cell search for a defined frequency range before the UE selects or re-selects a cell. In some examples, a UE may perform the cell search when the UE is powered ON, when the UE is moving (e.g., under the mobility in connected mode), and/or when the UE is in an idle/inactive mode (e.g. the UE may perform a cell reselection procedure after the UE camps on a cell and stays in the idle mode), etc.

To perform the cell search (e.g., the initial cell search and/or the cell reselection), a UE may use/decode synchronization signal(s) transmitted from one or more cells, where the UE may obtain or derive information related to the one or more cells and/or their access information based on the synchronization signal(s). In one example, a cell may transmit one or more types of synchronization signals, such as a primary synchronization signal (PSS) and a secondary synchronization signal (SSS), along with physical broadcast channel (PBCH), in a synchronization signal block (SSB) to UEs within its transmission range, e.g., as described in connection with FIG. 2B. The UE may perform the cell search based on the SSB. In some examples, a UE may first decode PBCH before the UE may receive other system information transmitted on physical downlink shared channel (PDSCH).

Figure 4:
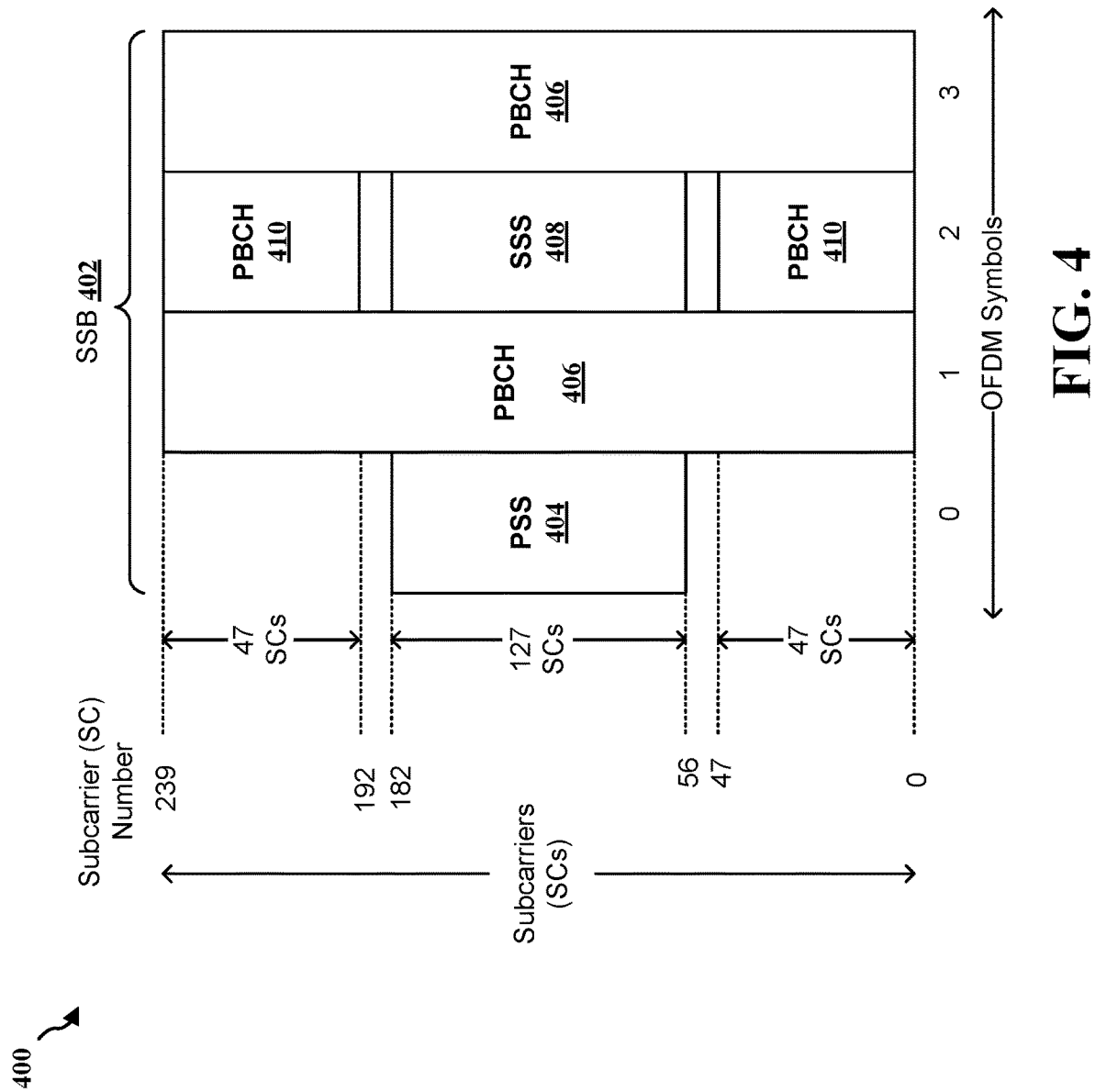
FIG. 4 is a diagram illustrating an example of an SSB.

FIG. 4 is a diagram 400 illustrating an example of SSB. An SSB 402 may span four (4) OFDM symbols with one (1) symbol for a PSS 404, two (2) symbols for PBCH 406, and one (1) symbol with an SSS 408 and PBCH 410 that are frequency division multiplexed (FDMed). The length of an OFDM symbol or a slot may be scaled with subcarrier spacing (SCS), and there may be seven (7) or fourteen (14) symbols per slot. For example, different frequency ranges may have different SCS, where 15, 30, and/or 60 kHz SCS may be used for the lower frequency bands (e.g., the FR1), and 60, 120, and/or 240 kHz SCS may be used for the higher frequency bands (e.g., the FR2). In one example, the PSS 404 may be mapped to 127 subcarriers (SCs) around the center frequency of the SSB 402, where the PSS 404 may use a length 127 frequency domain-based M-sequence (e.g., made up of 127 M-sequence values), which may have up to three (3) possible sequences. The M-sequence may also be referred to as a maximum length sequence (MLS), which may be a type of pseudorandom binary sequence. The SSS 408 may also be mapped to 127 SCs and may use a length 127 frequency domain-based Gold Code sequence (e.g., two (2) M-sequences are used), which may have up to 1008 possible sequences. A UE may use the information included in the PSS 404 and/or the SSS 408 for downlink frame synchronization and for determining the physical cell ID of the cell. The PBCH 406 and/or 410 may be modulated with quadrature phase shift keying (QPSK), which may be coherently demodulated by a UE using the associated DMRS carried in the PBCH 406 and/or 410. The PBCH 406 and/or 410 may include the master information block (MIB) part of the MAC layer broadcast channel (BCH). The other part of the BCH, such as the system information block (SIB), may be included in a PDSCH allocation encoded with the system information-radio network temporary identifier (SI-RNTI).

During an initial cell search or a cell reselection, a UE searching for a cell may use a sliding window and correlation technique to look for the PSS 404. For example, the UE may use a sliding window with a length of one (1) symbol to try to correlate one or more possible PSS sequences as the UE may not know which SCs are used by the PSS 404. In addition, due to the Doppler, internal clock frequency shifts, and/or other frequency errors associated with the PSS 404, the UE may use different timing hypothesis and/or frequency hypothesis to account for these errors. For example, for each timing hypothesis, the UE may try to use all three sequences+N frequency hypothesis to account for the Doppler, internal clock frequency shifts, and any other frequency errors, etc.

In some examples, the timing and/or frequency for a PSS (e.g., the PSS 404) may not be known to a UE. As such, a UE may use the PSS for symbol timing and/or initial frequency offset estimations. The cell ID ($N_{ID}^{cell}$) of a cell may be in two parts, where $N_{ID}^{cell}=3N_{ID}^{(1)}+N_{ID}^{(2)}$. The PSS may include the cell ID part 2 ($N_{ID}^{(2)}$), which may have one (1) out of three (3) possible values, e.g., $N_{ID}^{(2)}=0, 1, 2$. After the UE decodes the PSS, the UE may know the estimated timing and/or the frequency for an SSS (e.g., the SSS 408) associated with the PSS. Then, the UE may search for or correlate the associated SSS based on the estimated timing and/or the frequency. The SSS may include the cell ID part 1 ($N_{ID}^{(1)}$), which may have one (1) out of 366 possible values. The SSS may be based on two M-sequences (e.g., the Gold Code sequence), where an M-sequence may be a pseudo-random binary sequence which may be created by cycling through every possible state of a shift register of length n, resulting in a sequence of length $2^n-1$. For example, the SSS may include two cyclic shifts:

$$m_0 = \left(3\left\lfloor\frac{N_{ID}^{(1)}}{112}\right\rfloor + N_{ID}^{(2)}\right)5$$

and $m_1=(N_{ID}^{(1)} \mod 112)$, where the indices $m_0$ and $m_1$ may be derived from the $N_{ID}^{(2)}$ to determine the cyclic shifts.

Referring back to FIG. 4, based on the PSS 404 and/or the SSS 408, the UE may know the timing and/or frequency of the PBCH 406 and 410 (collectively as the PBCH) within the SSB 402. The PBCH may include 576 resource elements (REs) (e.g., 1 RE=1 SC×1 symbol), where 576 REs=240×2 (at symbols one and three)+(48+48) (at symbols two)=number of REs. The PBCH may carry the MIB and DMRS, and the PBCH may be modulated with QPSK. The UE may perform coherent demodulation of the PBCH based on the DMRS carried in the PBCH. In addition, the UE may use the DMRS to perform channel estimation. In one example, the DMRS may carry, or used by the UE to determine, three (3) least significant bits (LSB) (e.g., for the FR2) of an SSB index per half frame from a DMRS sequence index. For example, under the FR2, a base station or one or more transmission reception points (TRPs) of a base station may communicate with a UE using more than one beams (e.g., up to 64 beams), where each beam may correspond to one beam index. In some examples, each beam index may further be associated with an SSB index, such that the base station may indicate to the UE which beam(s) may be used by the base station for transmission through the SSB index. As a base station or TRP(s) of a base station may use up to 64 beams, the SSB index may be six (6) bits long (e.g., $2^6=64$), where three (3) bits may be carried in the DMRS, and the other three bits may be multiplexed with the PBCH (e.g., as shown by "MSB of SSB index" within FIG. 5). In some examples, the DMRS may be interleaved (e.g., in frequency) with the PBCH data at every $4^{th}$ SC (e.g., RE), such that the DMRS may include 144 REs (e.g., 60×2+12+12). The UE may use the DMRS, the SSS (e.g., 408) and/or the PSS (e.g., 404) signals in an SSB (e.g., 402) to refine the frequency offset estimation.

Figure 5:
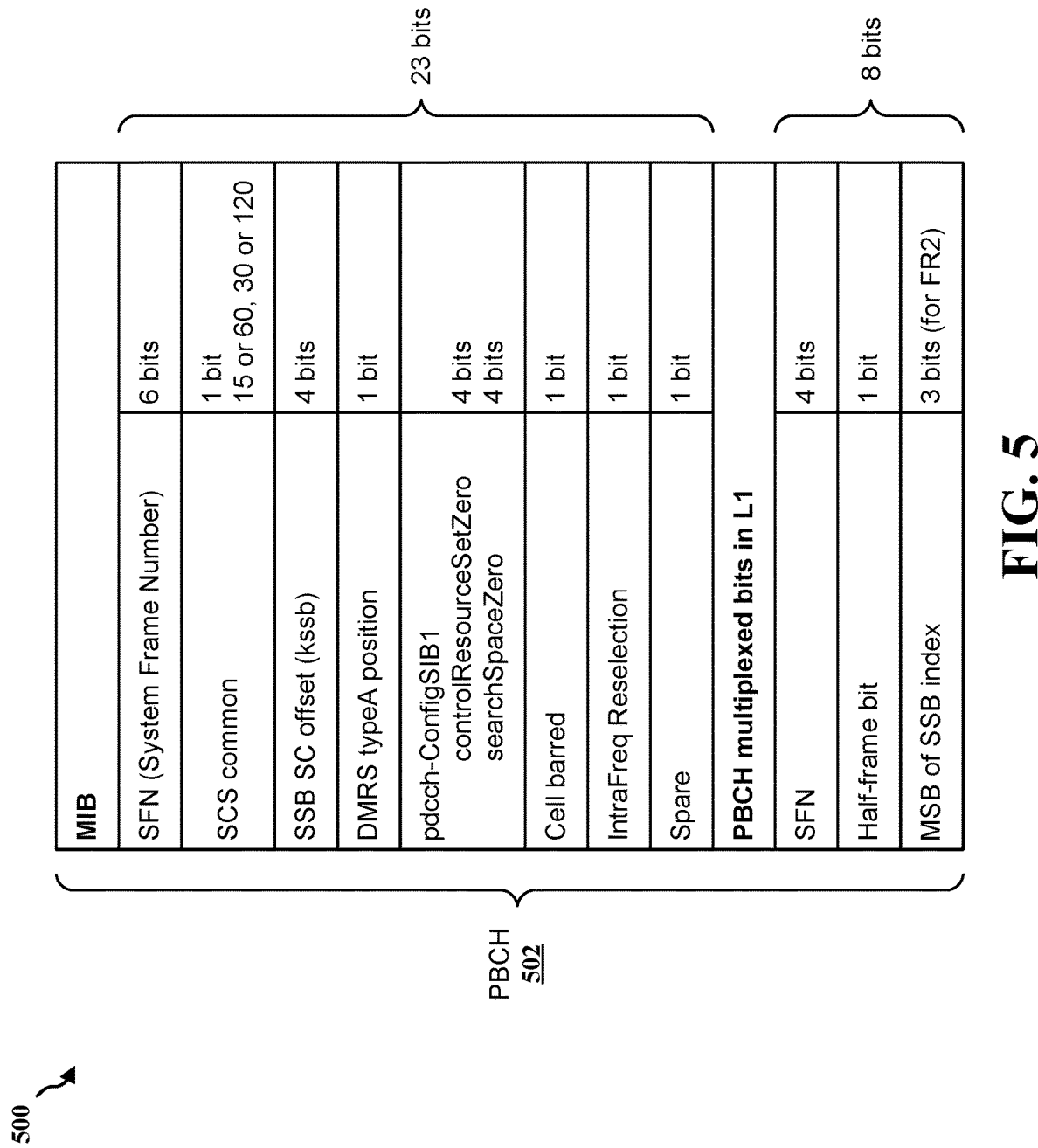
FIG. 5 is a diagram illustrating an example of information that may be included in PBCH of an SSB.

FIG. 5 is a diagram 500 illustrating an example of information that may be included in PBCH of an SSB. A PBCH 502 may be thirty-one (31) bits long, such as for a network operating within the FR2, and the PBCH 502 may include one or more parameters that may be used by a UE to decode a system information block type one (SIB1) message (e.g., SIB1 PDSCH). For example, the MIB within the PBCH 502 may carry a pdcch-ConfigSIB1 field that includes a parameter for an initial CORESET (e.g., a "controlResourceSetZero" parameter) and a parameter for an initial search space set (e.g., a "searchSpaceZero" parameter). The "controlResourceSetZero" parameter may guide the UE to a CORESET0, where the CORESET0 may carry a PDCCH that has information for scheduling a SIB1 PDSCH. For example, the "controlResourceSetZero" parameter may be four (4) bits long, and the UE may use this parameter to determine a multiplexing pattern (discussed below) and the CORESET0's frequency offset, number of resource blocks (RBs) and/or number of symbols, etc. The "searchSpaceZero" parameter may be four (4) bits long, and the UE may use this parameter to determine the CORESET0's time location. Thus, based on the information included in the "controlResourceSetZero" parameter and/or the "searchSpaceZero" parameter, the UE may identify or determine the location (e.g., in time and/or frequency) of the CORESET0.

The PDCCH within the CORESET0 may include a download control information (DCI) message, such as a DCI format 1_0 message. The DCI may be cyclic redundancy check (CRC) scrambled with the SI-RNTI, and the DCI may include information for scheduling the grant for the SIB1 PDSCH. In other words, the grant for the SIB1 PDSCH may be transmitted in a DCI format 1_0 carried within a PDCCH of a CORESET0 with CRC scrambled by an SI-RNTI. In one example, the DCI, such as the DCI format 1_0, may be 37, 39, or 41 bits long depending on the number of bits for the associated CORESET0, and the DCI may be transmitted by a cell using PDCCH type0 on search space set 0 (SS0) on CORESET0. In some examples, the CORESET0 may be 1, 2 or 3 symbols long, e.g., 24, 48 or 96 RBs respectively.

FIG. 6 is a diagram 600 illustrating an example of information or parameters that may be included in DCI, such as within the DCI format 1_0. A DCI 602 may include a frequency domain resource allocation (FDRA) field, a time domain resource allocation (TDRA) field, a virtual resource block (VRB) to physical resource block (PRB) mapping field, a modulation coding scheme (MCS) field, a redundancy version (RV) field, a system information indication (SI) field, and/or a reserved field. The reserved field may be up to fifteen (15) bits in length, and may be used by a cell to align the size of the DCI format 1_0 to other format(s) of DCI.

An SSB and a CORESET0 may be multiplexed with different multiplexing patterns, where a UE may determine which multiplexing pattern is used based on the "controlResourceSetZero" parameter within the MIB. For example, the SSB and the CORESET0 multiplexing for the FR2 may have at least three multiplexing patterns. In a first multiplexing pattern, the SSB and the CORESET0 symbols may be time division multiplexed (TDMed). In a second multiplexing pattern, the SSB and the CORESET0 may use different SCSs, and the SSB and the CORESET0 may be frequency division multiplexed (FDMed) and/or TDMed. In a third multiplexing pattern, the SSB and the CORESET0 may use a same SCS, and the SSB and the CORESET0 may be FDMed. In some examples, for the second multiplexing pattern and the third multiplexing pattern, a value "0" may be used for the "searchSpaceZero" parameter within the MIB.

As wireless technology continues to grow, higher frequency bands above the FR2 (e.g., 24.25 GHz-52.6 GHz) may be used, including in the sub-Terahertz (sub-THz) bands above 140 GHz or between 300 GHz and 3 THz, etc. The higher frequency radio technology, such as the sub-THz frequency range, may enable much narrower beam structures compared to the beam structures under the FR2 or below because more radiating elements may be placed per given area at the antenna due to smaller wavelength. The higher-frequency band may have short delay spread (e.g., few nanoseconds) and may be translated into coherence frequency bandwidth of 10's of MHz. As such, a higher operating frequency band may enable a UE to communicate with a base station or with another UE using larger bandwidths with higher throughput.

However, transmissions between a UE and a base station using a larger bandwidth and/or at a higher operating frequency may encounter higher phase noise as the communication between the UE and the base station may be more likely to become out of phase with each other. In addition, a transmission using a higher frequency band may have a shorter transmission range compare to a transmission using a lower frequency band. Thus, a transmission using a higher frequency band may use a higher-power amplifier, which may consume more energy. Also, a power amplifier may follow linear behavior for a limited range of input signals, where an increase in the input signal may provide a proportional increase to the output signal. However, the power amplifier may also have non-linear behavior outside the range of the input signals. For example, as the output signal power of a power amplifier may not increase indefinitely, at a saturation point, an increase in input signal power of the power amplifier may not produce a discernible increase in the output signal power. In other words, when a power amplifier is saturated, the power amplifier's output signal may not be proportional to the input signal, where a large increase in the input signal power may yield a relatively small increase in the output signal power.

To avoid the drawbacks of the non-linearity at higher input powers, a power amplifier may be configured to operate at a mean input power that is several dB lower than the saturation point, such that the input signal power does not exceed the saturation input signal power. For example, peak to average power ratio (PAPR) may be used to define a relationship between the maximum power of a sample in a given OFDM transmit symbol divided by the average power of that OFDM symbol. In other words, PAPR may be the ratio of peak power to the average power of a signal. A high PAPR may occur when different sub-carriers are out of phase with each other. The value of PAPR may impact the efficiency of a power amplifier. For example, if the saturation point of a power amplifier is 25 dB and the PAPR for a communication using the power amplifier is 8 dB, the power amplifier may be configured to operate at 17 dB (e.g., keeping 8 dB headroom from peak power) instead of operating close to 25 dB. Thus, the power amplifier may be operating with a large back off, which may degrade the efficiency of the power amplifier.

For network communication involving larger bandwidths, different waveforms may be used for data transmissions, such as for downlink operations. For example, a single carrier waveform in frequency domain, such as a discrete Fourier transform-spread-OFDM (DFT-s-OFDM), may be implemented for network communication involving larger bandwidths. The single carrier waveform in the frequency domain may provide a low PAPR for the communication, which in turn may provide a better transmission coverage for a transmitting device as the efficiency of the power amplifier used by the transmitting device may be increased. The single carrier waveform in frequency domain may also enable a receiving device to equalize a received signal using a single tap frequency domain equalization (FDE), which may provide a simpler equalization process that is less complex and/or less costly to implement. The single carrier waveform in frequency domain may also provide a more efficient bandwidth utilization as it does not use guard bands.

In another example, a single carrier waveform in the time domain, such as a single-carrier quadrature amplitude modulation (SC-QAM), may be implemented for network communication involving larger bandwidths. The single carrier waveform in time domain may provide a low PAPR for the communication (e.g., lower than the single carrier waveform in frequency domain), and it may also have a lower complexity in implementation as it does not use fast Fourier transform (FFT) and/or inverse-FFT (IFFT). However, a receiving device (e.g., a UE or a base station) receiving the single carrier waveform in time domain may be specified to use a higher complexity time domain equalizer to process the received signal, which may be more expensive and complex to implement.

In another example, an OFDM waveform may be used for the network communication involving larger bandwidths. While communication using an OFDM waveform may yield a higher PAPR, the OFDM waveform may provide high signal-to-noise-ratio (SNR) and high spectral efficiency. The OFDM waveform may also be used for higher order MIMO to achieve higher data rate. Similarly, the OFDM waveform may be equalized with a single tap FDE, and the OFDM waveform may provide a more efficient bandwidth utilization as no guard band is used. In addition, the OFDM waveform may enable easier FDM capabilities for transmitting and receiving devices.

In some examples, to combat or reduce the phase noise resulting from network devices (e.g., UEs and base station) communicating with each other using larger bandwidth and/or at higher frequency bands, the SCS of OFDM symbol used by the network devices may be increased (e.g., to 960 kHz, 1920 kHz, 3840 kHz, etc.). With larger SCS, it may be easier for network devices to estimate and compensate the phase noise, which may be aggravated in higher carrier frequency bands. Also, increasing the SCS size may also increase the overall channelization bandwidth with a manageable FFT size, which may be advantageous for the network devices. In addition, to combat or avoid intersymbol interference in a multipath channel, a cyclic prefix (CP) may be inserted between successive OFDM symbols as a guard band. In other words, the CP may act as a buffer region or guard interval to protect the OFDM signals from intersymbol interference. However, as the length of an OFDM symbol and the length of a CP associated with the OFDM symbol may be inversely proportional to the size of the SCS (e.g., OFDM symbol length=1/SCS), the length of an OFDM symbol and its associated CP may decrease proportionally as the SCS increases. FIG. 7 is a table 700 illustrating examples of OFDM symbol lengths (e.g., Tsymb) and associated CP lengths (Tcp) for different SCSs. For example, an OFDM symbol with an SCS of 15 KHz may have a symbol length of 66666.7 nanoseconds (ns) and a CP length of 4687.5 ns; an OFDM symbol with an SCS of 120 KHz may have a symbol length of 8333.3 ns and a CP length of 585.9 ns; and an OFDM symbol with an SCS of 960 KHz may have a symbol length of 1041.7 ns and a CP length of 73.2 ns, etc.

As described in connection with FIG. 4, a base station or one or more transmission reception points (TRPs) of a base station may communicate with a UE using more than one beams (e.g., up to 64 beams). Thus, a base station may transmit SSB (e.g., 402) using different beams (e.g., SSB beams). As it may take time for a base station to perform a beam switching, the base station may be configured with beam switching gaps between consecutive SSB beams to facilitate the beam switching. In some examples, if the beam switching time of a base station is less than the duration of CP between OFDM symbols used by the base station, the base station may perform the beam switching within the CP duration. In other words, the base station may utilize the duration of the CP as a beam switching gap.

Figure 8:
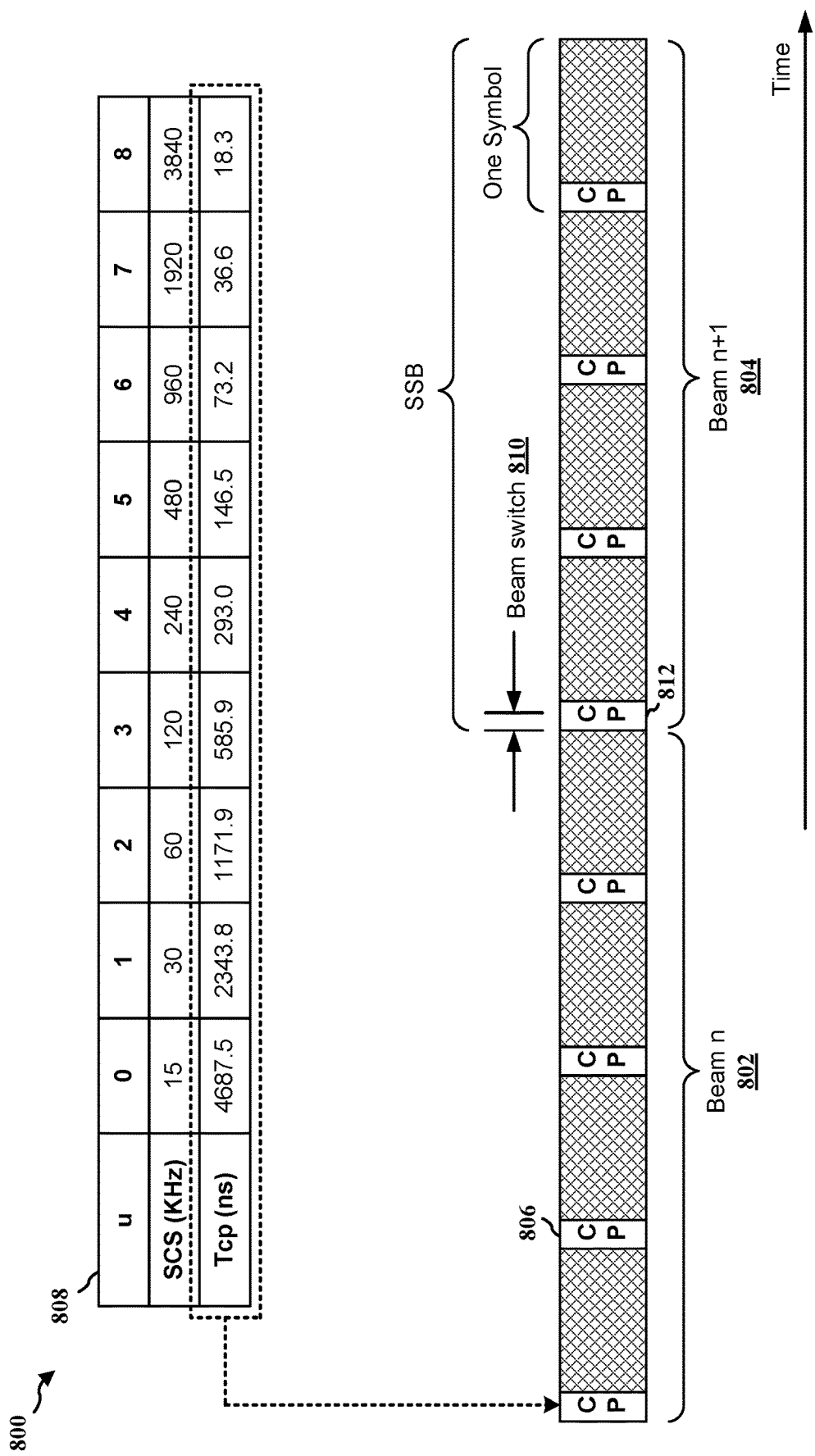
FIG. 8 is a diagram illustrating an example of performing beam switching during a CP between symbols.

FIG. 8 is a diagram 800 illustrating an example of performing beam switching during a CP duration. A base station may be configured to transmit an SSB from a first beam 802 (e.g., beam n) using four (4) symbols, and then transmit another SSB from a second beam 804 (e.g., beam n+1) using another (4) symbols. A CP 806 may be configured between symbols, where the duration of the CP 806 (e.g., Tcp) may be determined based on the SCS associated with the symbols used for transmitting the SSB, such as shown by a Table 808. For example, if the SCS is 30 KHz, the duration of the CP 806 may be 2343.8 ns.

After transmitting the SSB using the first beam 802, the base station may perform a beam switch 810 to the second beam 804. As illustrated by FIG. 8, if the duration for the beam switch 810 is shorter than the duration of the CP 806, the base station may perform the beam switch 810 within a CP, such as shown at 812. For example, if the beam switch 810 takes 100 ns to perform and the duration of the CP 806 is 2343.8 ns (e.g., for 30 KHz of SCS), the base station may perform the beam switch 810 within the CP. In other words, if the CP length is greater than the time it takes for a base station to perform beam switching, the CP length may absorb the SSB beam switching gap, such that the base station may not expect additional configuration for explicit gap(s).

On the other hand, as the duration of the CP decreases when the SCS increases, for higher bands that use higher SCS, the duration of symbols and the CP may become much shorter, where absorbing an SSB beam switching gap in a CP may not be possible. For example, as shown by diagram 900 of FIG. 9, if it takes 100 ns for a base station to perform a beam switch 910 and the duration of a CP 906 is 18.3 ns (e.g., for 3840 KHz of SCS), the base station may not be able to perform the beam switch 910 within the CP 906. In one example, the base station may be configured with an additional SSB beam switching gap, where the base station may skip a symbol between SSB transmissions, e.g., between SSB transmissions from beam n and beam n+1, such as shown at 912. While this may enable the base station to have sufficient time to perform the beam switch 910, the SSB beam switching gap may be considerable in length compared to the length of a symbol, and the SSB beam switching gap may have a larger overhead which may lead to an inefficient use of wireless resources.

In one example, if the SSB and the CORESET0 symbols are multiplexed based on TDM, such as described above in connection with the first multiplexing pattern, additional beam switching gaps may be configured for CORESET0 beams (i.e., beams for transmitting CORESET0), which may further increase resource waste. For example, as shown by diagram 1000 of FIG. 10, SSB symbols 1002 and their corresponding CORESET0 symbols 1004 may be multiplexed based on TDM. When a beam switching gap 1006 is configured between SSB transmissions from different beams of a base station (e.g., between SSB beam n and SSB beam n+1), a similar time switching gap 1006 may also be configured between CORESET0 transmissions from different beams of the base station (e.g., between CORESET0 beam n and CORESET0 beam n+1). This may double the amount of wasted resources due to the double beam switching gaps, such as shown at 1008. In other words, when the CORESET0 is TDMed with the SSB, the beam switching gaps are needed between SSB beams as well as CORESET0 beams, which may increase or double the wasted resources. Thus, configuring additional beam switching gap for a base station when the SCS is high (e.g., beam switching time>Tcp) may not be suitable when the SSB and the CORESET0 are TDMed.

In addition, if the SSB and the CORESET0 symbols are multiplexed based on both TDM and FDM, such as described above in connection with the second multiplexing pattern, additional beam switching gaps may still be configured for CORESET0 beams as the SSB and the CORESET0 are still TDMed. For example, as shown by diagram 1100 of FIG. 11, SSB symbols 1102 and their corresponding CORESET0 symbols 1104 may be multiplexed based on both TDM and FDM. When a beam switching gap 1106 is configured between SSB transmissions from different beams of a base station (e.g., between SSB beam n and SSB beam n+1), a similar time switching gap 1106 may also be configured between CORESET0 transmissions from different beams of the base station (e.g., between CORESET0 beam n and CORESET0 beam n+1). This may increase wasted resources due to the additional beam switching gaps configured for CORESET0 beams. As such, configuring additional beam switching gap for a base station when the SCS is high (e.g., beam switching time>Tcp) may also not be suitable when the SSB and the CORESET0 are both TDMed and FDMed.

In another example, if the SSB and the CORESET0 symbols are multiplexed based on FDM, such as described above in connection with the third multiplexing pattern, additional beam switching gaps may not be configured for CORESET0 beams of a base station when the SCS is high (e.g., beam switching time>Tcp). While FDM may provide a good option for configuring beam switching gaps as additional beam switching gaps are not configured for CORESET0 beams, this solution may not be usable/desirable for single carrier waveforms, such as the SC-QAM, as it may not be easy or possible to implement.

Figure 9:
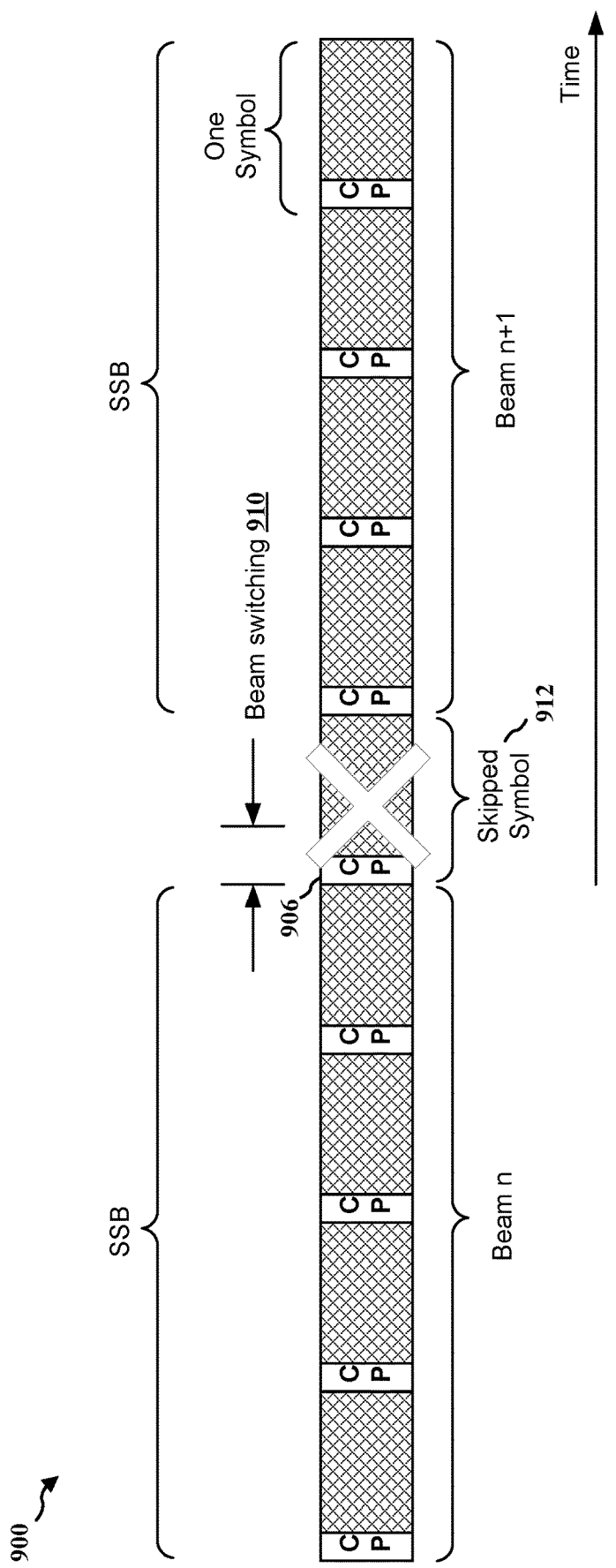
FIG. 9 is a diagram illustrating an example of a beam switching time exceeding the duration of a CP.
Figure 10:
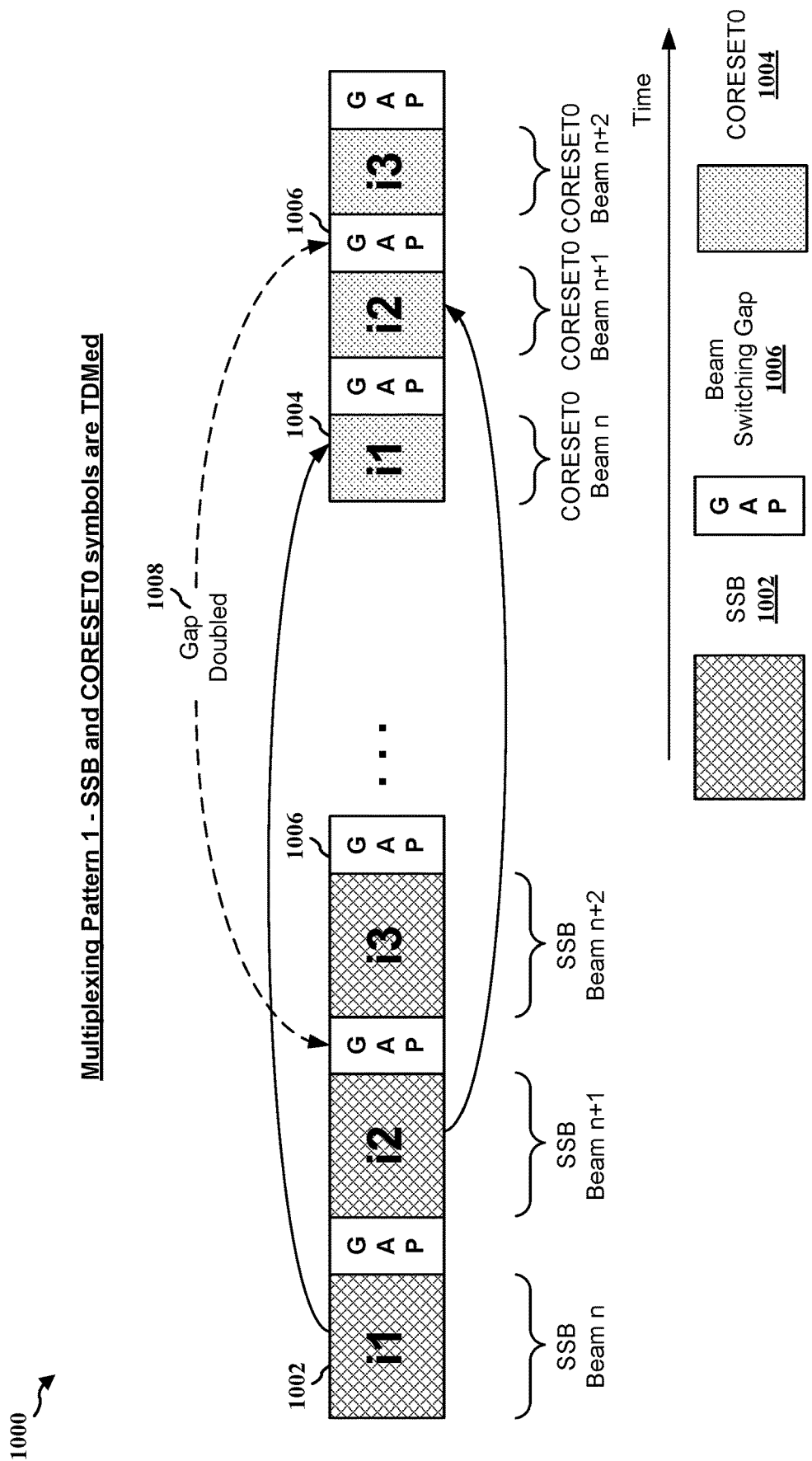
FIG. 10 is a diagram illustrating an example of a multiplexing pattern for SSB and CORESET0 symbols.
Figure 11:
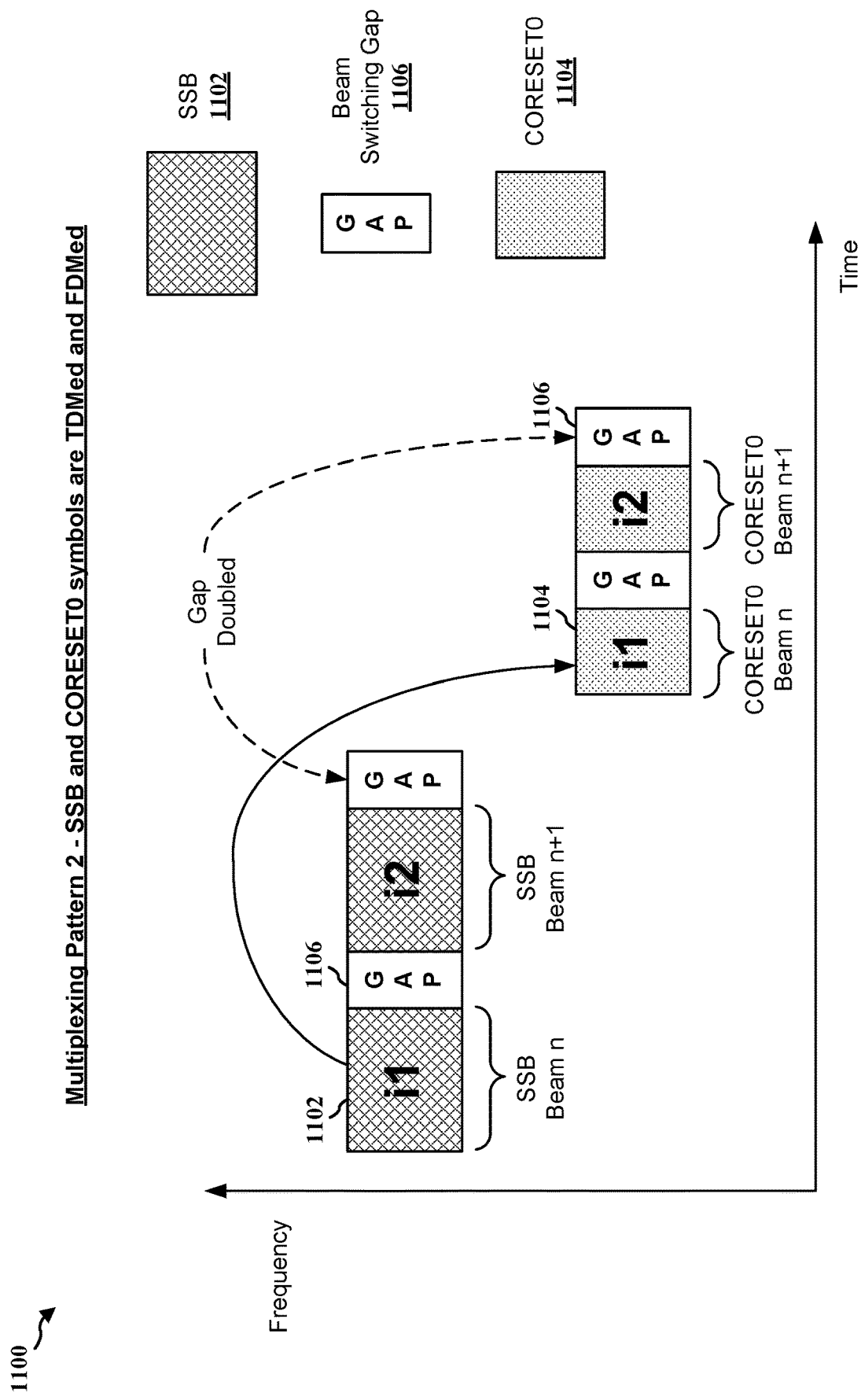
FIG. 11 is a diagram illustrating an example of a multiplexing pattern for SSB and CORESET0 symbols.

In one aspect of the present disclosure, to reduce the effects and duplication of the beam switching gaps when SSB and CORESET0 are multiplexed based on TDM (e.g., the first multiplexing pattern) or based on both TDM and FDM (e.g., the second multiplexing pattern), such as described in connections with FIGS. 9 to 11, for each beam (e.g. beam n, beam n+1, beam n+2, etc.), the SSB and the CORESET0 may be grouped in a single block, such as within an SS/PBCH/CORESET0 block (hereafter "SSCB"). Then, a base station may transmit the SSB and CORESET0 in an SSCB from one beam, and then transmit the SSB and CORESET0 in the SSCB from another beam after a beam switching gap. For example, as shown by diagram 1200A of FIG. 12A, when an SSB 1202 and its corresponding CORESET0 1204 symbols are multiplexed based on TDM, a base station may group the SSB 1202 and the CORESET0 1204 in time domain into an SSCB 1208. Then, the base station may transmit the SSCB 1208 using a first beam 1210 (e.g., beam n), and the base station may transmit another SSCB 1208 using a second beam 1211 (e.g., beam n+1) after a beam switching gap 1206. As such, one beam switching gap is configured for transmitting both the SSB 1202 and the CORESET0 1204.

Figures 12A, 12B, 12C:
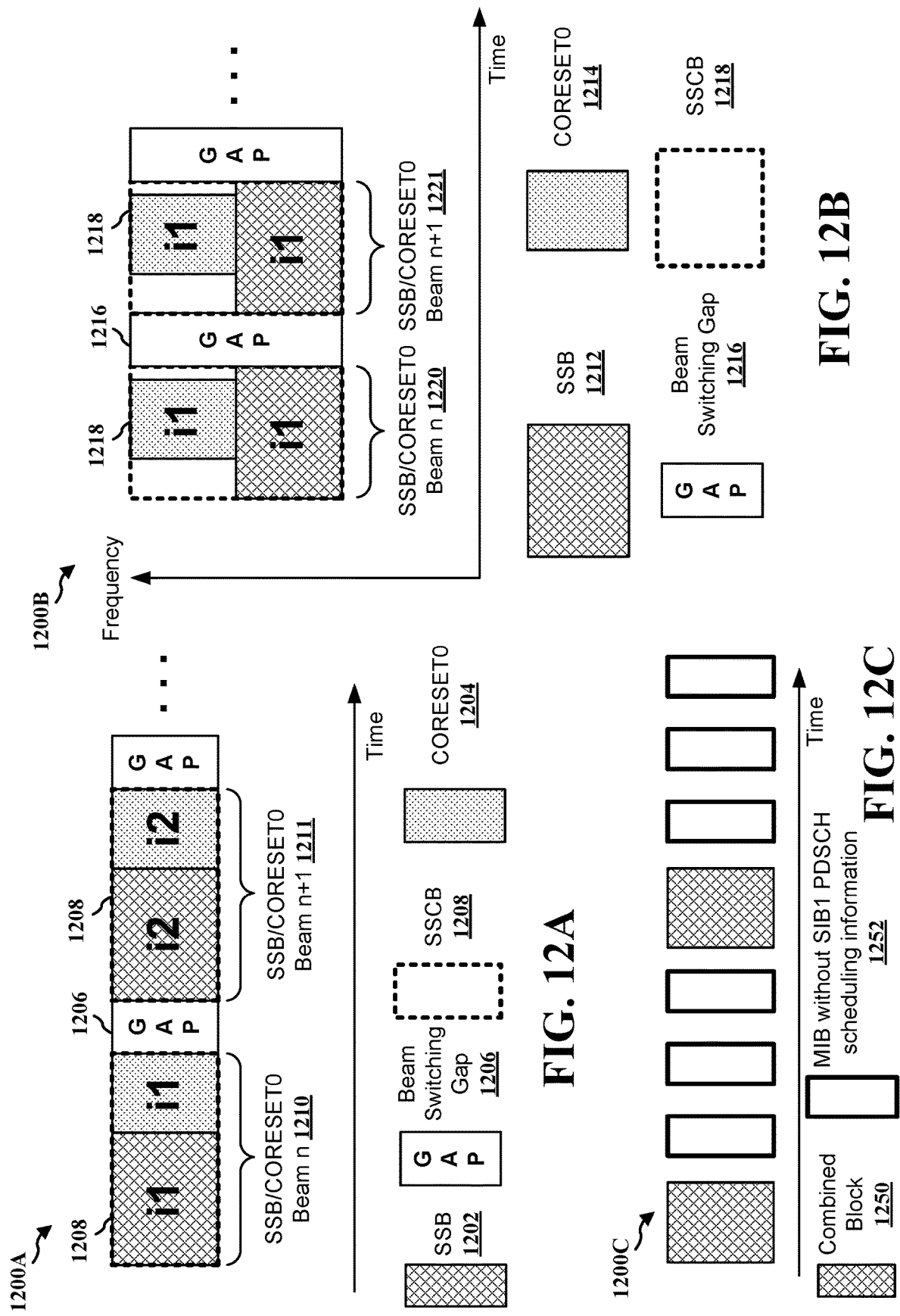
FIGS. 12A, 12B, and 12C are diagrams illustrating examples of multiplexing SSB and CORESET0 in a single block according to aspects of the present disclosure.

In another example, as shown by diagram 1200B of FIG. 12B, a base station may multiplex an SSB 1212 and a CORESET0 1214 in a single block (e.g., an SSCB 1218) based on FDM, such as when an OFDM or a DFT-s-OFDM waveform is used for the SSB 1212 and the CORESET0 1214. Then, the base station may transmit the SSCB 1218 using a first beam 1220 (e.g., beam n), and the base station may transmit another SSCB 1218 using a second beam 1221 (e.g., beam n+1) after a beam switching gap 1216. As such, one beam switching gap is configured for transmitting both the SSB 1212 and the CORESET0 1214.

As discussed in connection with FIG. 5, an MIB within a PBCH (e.g., 502) may contain information on the location in time and frequency as well as number of RBs and symbols of a CORESET0 and/or a search space zero (SS0), such as under the pdcch-ConfigSIB1 field that includes the "controlResourceSetZero" parameter and the "searchSpaceZero" parameter. The CORESET0/SS0 may contain a DCI that includes information for scheduling a SIB1 PDSCH, where the DCI may include DCI format 1_0 that is CRC scrambled with SI-RNTI. In some examples, the CORESET0 may also carry DCI for other information, such as a paging DCI. In other words, for a UE to find information for scheduling a SIB1 PDSCH, the UE may first decode the MIB message in an SSB to find an associated CORESET0/SS0, and then based on the CORESET0/SS0, the UE may find the DCI message that includes the scheduling information for the SIB1 PDSCH. However, to reduce the number of SSB switching gaps, as described in connection with FIGS. 12A and 12B, the SSB (including the PBCH) and the CORESET0 may be concatenated together (e.g., grouped into an SSCB) in time or frequency. If the SSB and the CORESET0 are concatenated (e.g., back-to-back in time or overlapping in time), it may not be efficient for a base station to transmit the MIB and the DCI (e.g., DCI format 1_0 with SI-RNTI) messages separately.

Aspects presented herein may enable a base station to transmit a single message/channel that carries both MIB information and DCI using a similar number of bits as compared to a separate MIB and DCI, thereby improving the efficiency of wireless communication. In one aspect of the present disclosure, when a single carrier waveform is used for communication, a base station may eliminate or exclude one or more fields or parameters from an MIB or a DCI, such that the base station may transmit the MIB and the DCI to a UE in a single message/channel while keeping the size of the single message/channel (e.g., the combined MIB and DCI) equal to or less than the original size (e.g., before elimination/exclusion) of the MIB (e.g., up to 31 bits as shown by FIG. 5) or the original size of the DCI (e.g., up to 41 bits as shown by FIG. 6).

Figure 13:
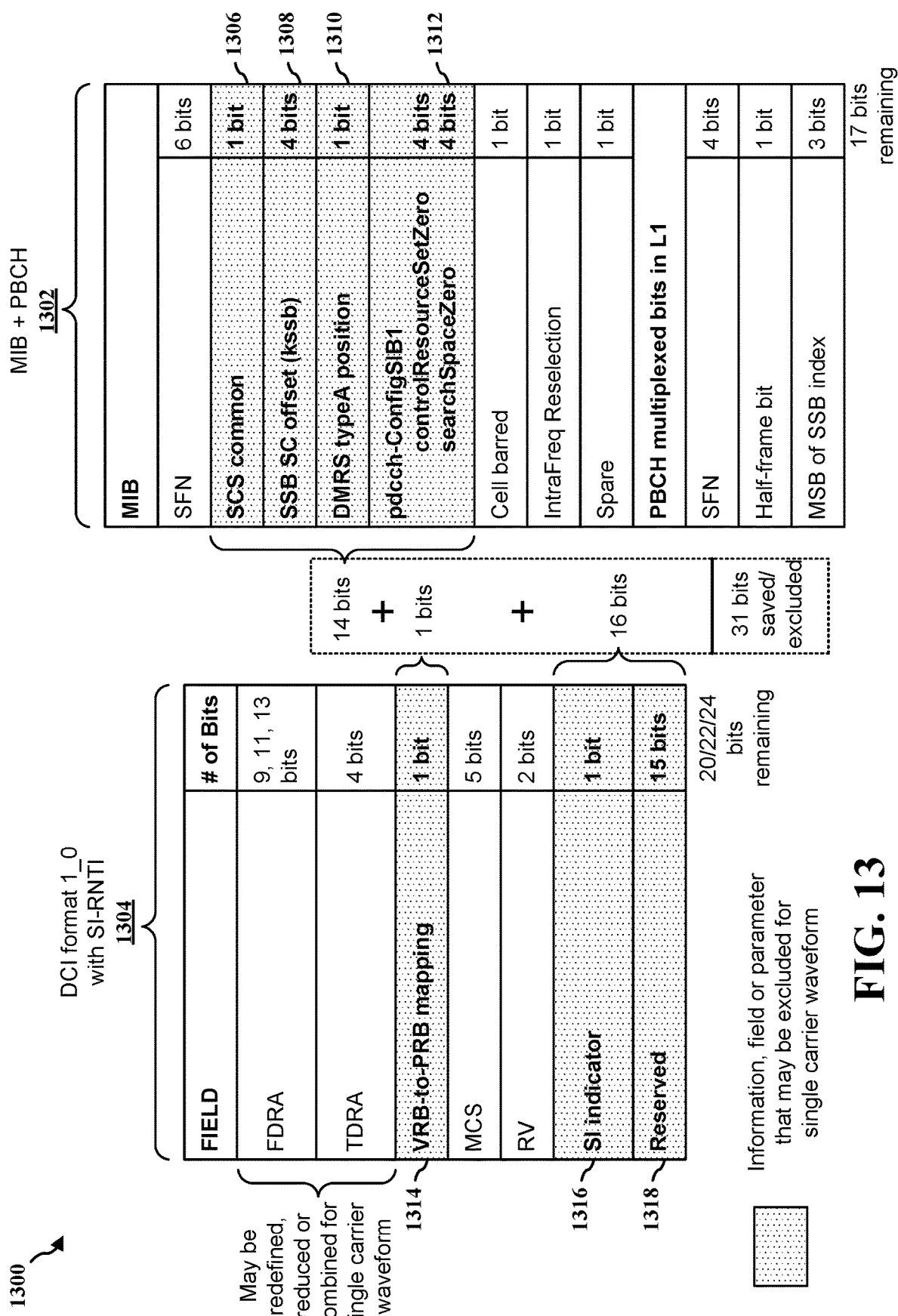
FIG. 13 is a diagram illustrating an example of information, field or parameter that may be excluded from an MIB and a DCI when a single carrier waveform is used for network communication according to aspects of the present disclosure.

FIG. 13 is a diagram 1300 illustrating an example of information, field or parameter that may be excluded from an MIB 1302 and a DCI 1304 when a single carrier waveform is used for network communication. In one example, at least one or more of the following information, fields or parameters may be eliminated or excluded from the MIB 1302 when a single carrier waveform is used: 1) information related to whether to apply common SCS (e.g., the SCS common parameter 1306), which may be one (1) bit in length; 2) indication that indicates or sets the SSB/SC offset (e.g., the SSB SC offset parameter 1308), which may be four (4) bits in length; 3) indication that indicates a first symbol in which demodulation reference signal (DMRS) uses (e.g., the DMRS typeA position parameter 1310), which may be one (1) bit in length; and/or 4) information related to CORESET0 and/or SS0 (e.g., the pdcch-ConfigSIB1 field 1312 that includes parameters controlResourceSetZero and searchSpaceZero), which may be eight (8) bits in length.

For the DCI 1304, at least one or more of the following information, fields or parameters may be eliminated or excluded from the DCI 1304 when a single carrier waveform is used: 1) indication indicating whether resource allocation is based on interleaved or non-interleaved mapping (e.g., the VRB-to-PRB mapping parameter 1314), which may be one (1) bit in length; 2) indication indicating type of system information (e.g., the SI indicator parameter 1316), which may be one (1) bit in length; and/or 3) the reserved field 1318, which may be fifteen (15) bits in length. In addition, the FDRA field and the TDRA field that take up to 17 bits may be redefined for single carrier waveform. For example, the FDRA field and the TRDA field may be combined into one field to reduce number of bits used.

As such, when a single carrier waveform is used, a base station may save or exclude at least 14 bits from the MIB 1302 and at least 17 bits from the DCI 1304 (e.g., 31 bits in total). Hence both remaining information used for the MIB 1302 and the DCI 1304 may equal to approximately 40 bits (e.g., 17 remaining bits for the MIB 1302 and 20/22/24 remaining bits for the DCI 1304), which may be similar to the size of a DCI format 1_0 before eliminating or excluding one or more parameters, such as shown by FIG. 6. With this number of remaining bits for a combined message/channel, a comparable coverage may be achieved.

FIG. 14 is a diagram 1400 illustrating an example of a channel or a message that combines the remaining information from PBCH/MIB 1302 and DCI 1304 (e.g., from FIG. 13), where the channel or the message may be CRC scrambled with SI-RNTI. For purpose of the present disclosure, the channel or the message 1402 that combines the information in both PBCH/MIB and DCI 1_0 with CRC scrambled with SI-RNTI may be referred to as an "initial access information message" hereafter. The name is merely used to illustrate the concept of the present disclosure, and the channel or the message that combines information from PBCH/MIB and DCI may also be referred to by other names.

In one example, an initial access information message 1402 may include one or more information, fields and/or parameters associated with MIB/PBCH, and the initial access information message 1402 may also include one or more information, fields and/or parameters associated with DCI, such as scheduling information for a SIB1 PDSCH. For example, the initial access information message 1402 may include at least one or more of the followings:

1) a system frame number (SFN) parameter that may indicate the SFN associated with the MIB, the SFN parameter may be ten (10) bits in length, where the MIB may carry six (6) most significant bit (MSB) of the 10 bits (e.g., using a first SFN parameter 1404) and the remaining four (4) least significant bit (LSB) of the SFN may be conveyed in the PBCH transport block (e.g., using a second SFN parameter 1412) as part of channel coding (i.e. outside the MIB encoding);
2) a cell barred parameter 1406 that may identify the access status of a cell (e.g., a UE may not be allowed to access the cell if it is barred), which may be one (1) bit in length;
3) an intra frequency reselection parameter 1408 that may indicate if intra frequency cell reselection is allowed or not allowed, which may be one (1) bit in length;
4) a spare field 1410, which may be one (1) bit in length;
5) a half-frame bit parameter 1414 that may indicate whether an SSB is transmitted in the first half-frame or the second half-frame of a ten (10) ms frame, which may be one (1) bit in length;
6) an MSB of SSB index parameter 1416 that may indicate most significant bit(s) of an SSB index (e.g., SSB beam index), which may be three (3) bits in length and may be used by a UE in conjunction with the half-frame bit to achieve frame synchronization;
7) a frequency domain resource allocation (FDRA) field 1418 that may be associated with scheduling of the SIB1 PDSCH, which may be nine (9), eleven (11) or thirteen (13) bits in length;
8) a time domain resource allocation (TDRA) field 1420 that may also be associated with scheduling of the SIB1 PDSCH, which may be four (4) bits in length;
9) an MCS field 1422 which may indicate the MCS associated with the SIB1 PDSCH, which may be five (5) bits in length; and/or
10) a redundancy version (RV) parameter 1424 which may indicate the RV associated with the SIB1 PDSCH, etc.

In one aspect of the present disclosure, the aforementioned initial access information message (e.g., 1402) may be carried or transmitted using a channel similar to PBCH (e.g., 406, 502). For example, a PBCH message may be modified into an initial access information message by removing fields/information such as SCS common, SSB BC offset, DMRS typeA position and/or pdcch-ConfigSIB1 from the PBCH message and adding fields/information related to the SIB1 PDSCH scheduling such as FDRA, TDRA, MCS and/or RV into the PBCH message, as described in connection with FIG. 14.

Figure 15:
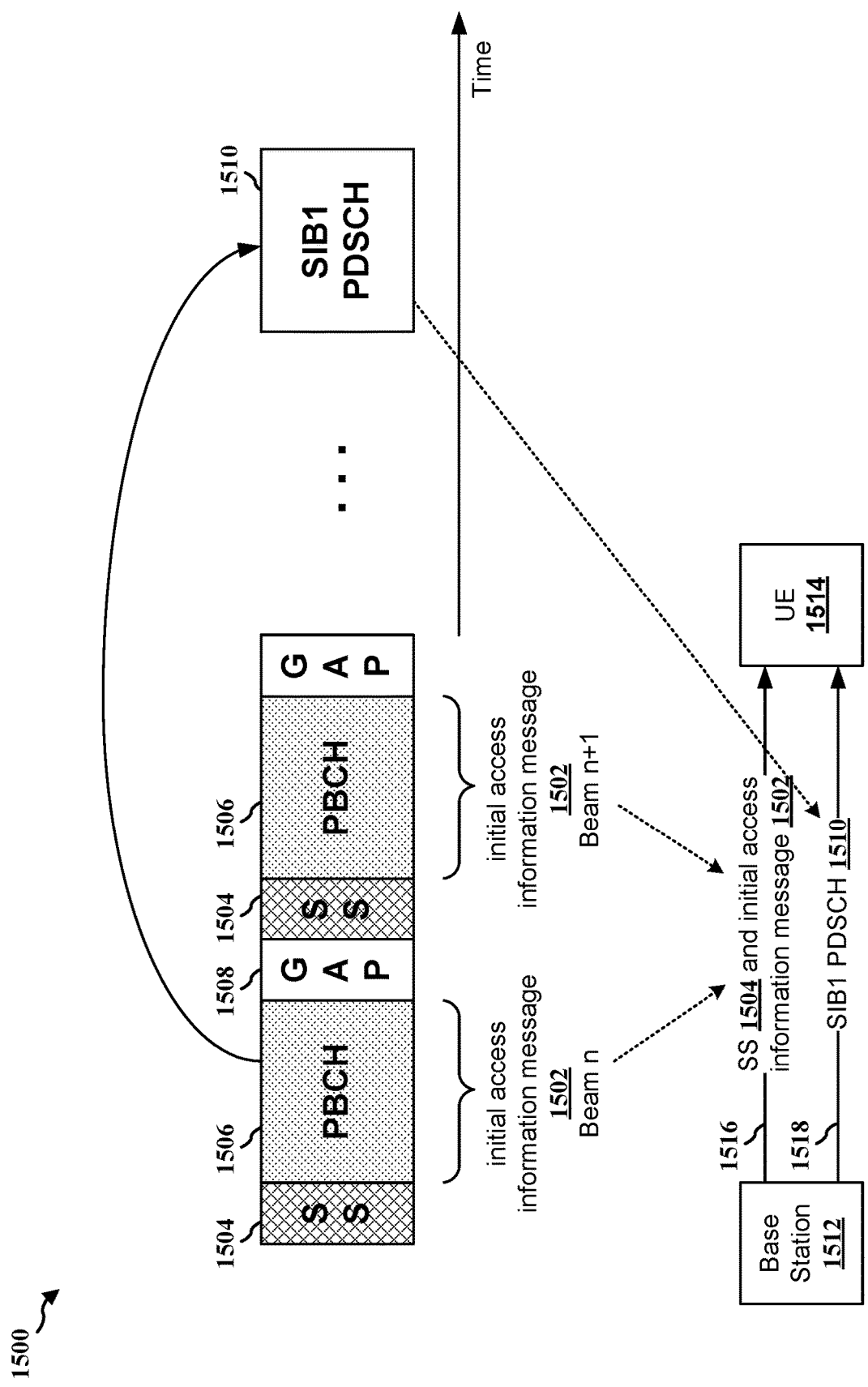
FIG. 15 is a diagram illustrating an example of an initial access information message that is carried using a channel similar to PBCH according to aspects of the present disclosure.

FIG. 15 is a diagram 1500 illustrating an example of an initial access information message that may be carried using a channel similar to PBCH. A base station 1512 may transmit an initial access information message 1502 (e.g., a MIB, DCI and PBCH combined block) to a UE 1514 in a PBCH 1506 following a synchronization signal (SS) 1504 (e.g., PSS 404 and/or SSS 408), such as shown at 1516. The initial access information message 1502 may contain information related to scheduling of a SIB1 PDSCH 1510, such as FDRA, TDRA, MCS and/or RV associated with the SIB1 PDSCH 1510. As such, the initial access information message 1502 may be used by the UE 1514 for scheduling the SIB1 PDSCH 1510. A gap 1508 may be configured between initial access information messages that are transmitted from different beams of the base station 1512 (e.g., between beam n and beam n+1) to enable the base station 1512 to perform beam switching, such as described in connection with FIGS. 9 and 10. As such, the initial access information message 1502 may provide the UE 1514 with an initial access that may have similar complexity as an SSB (e.g., 402). Then, the base station 1512 may transmit the SIB1 PDSCH 1510 to the UE 1514 after transmitting the initial access message 1502, such as shown at 1518. In some examples, the base station 1512 may not be able to multiplex other DCIs during a beam duration if the initial access information message 1502 is used/configured.

In another aspect of the present disclosure, for the UE 1514 to decode the PBCH 1506 (e.g., the initial access information message 1502), the UE 1514 may be configured to determine or identify the bandwidth (BW) of the PBCH 1506. In one example, the BW of the PBCH 1506 may be defined for the wireless network, such as in a specification. Thus, the UE 1514 may identify the BW of the PBCH 1506 based on the specification. In another example, the UE 1514 may be configured with multiple BW options (e.g., different BW sizes). Then, the UE 1514 may blind detect the BW of the PBCH 1506 based on the multiple BW options. In another example, the base station 1512 may indicate the BW of the PBCH 1506 to the UE 1514 in the synchronization signal 1504.

In another aspect of the present disclosure, an initial access information message (e.g., 1402) may be carried or transmitted using a message similar to DCI (e.g., 602), such as by using a PDCCH that is sent on a CORESET/search space. For example, a DCI message may be modified into an initial access information message by removing fields/information such as VRB-to-PRB mapping, SI indicator and/or reserved bits from the DCI message and adding fields/information related to MIB/PBCH such as SFN, cell barred, intra frequency selection, spare, half-frame bit and/or MSB of SSB index into the DCI message, as described in connection with FIG. 14.

Figure 16:
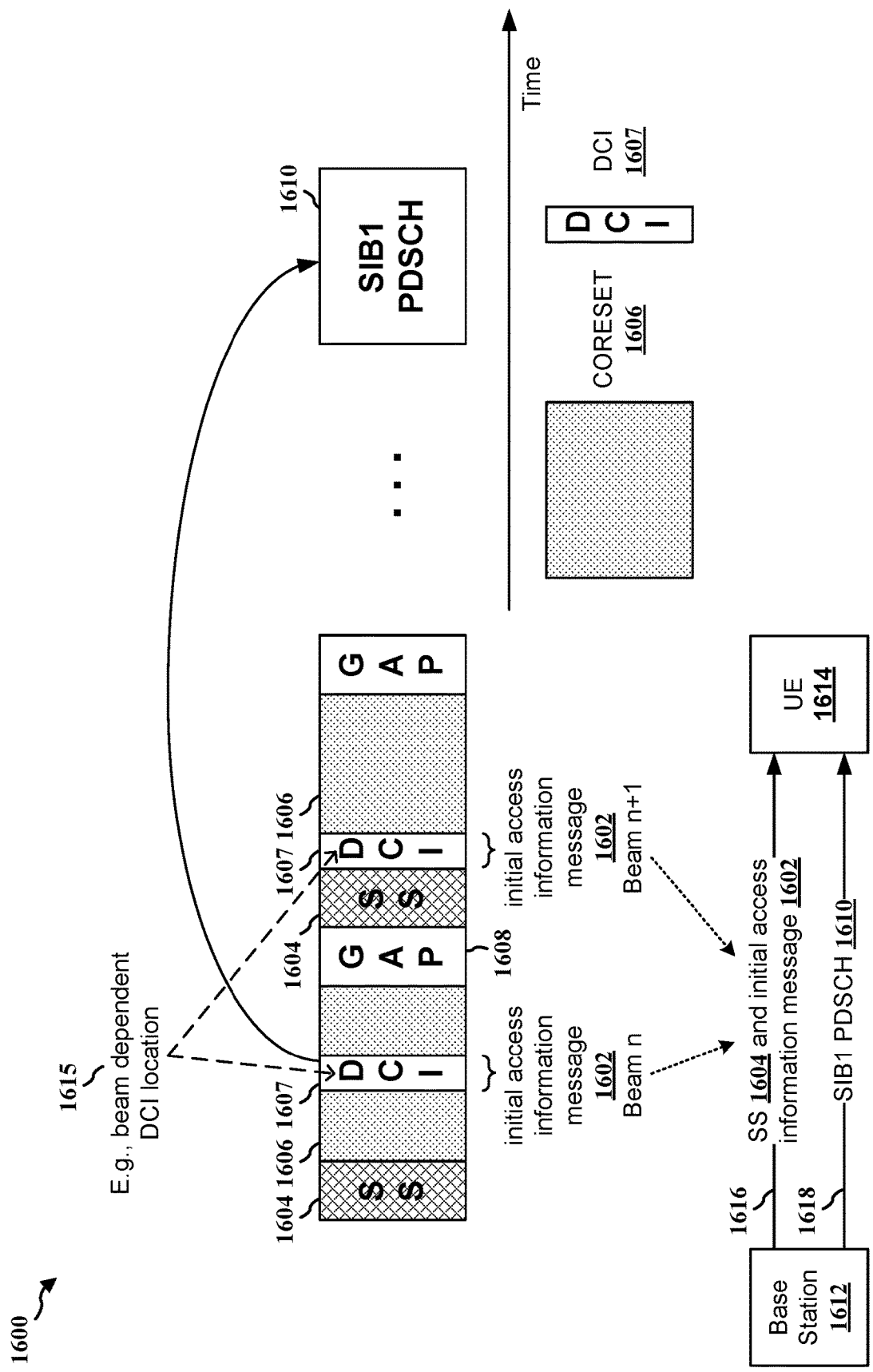
FIG. 16 is a diagram illustrating an example of an initial access information message that is carried using a message similar to DCI according to aspects of the present disclosure.

FIG. 16 is a diagram 1600 illustrating an example of an initial access information message that may be carried using a message similar to DCI. A base station 1612 may transmit an initial access information message 1602 (e.g., a MIB, DCI and PBCH combined block) to a UE 1614 in a DCI 1607 within a CORESET 1606 following a synchronization signal (SS) 1604 (e.g., PSS 404 and/or SSS 408), such as shown at 1616. The initial access information message 1602 (or the DCI 1607) may contain information related to scheduling of a SIB1 PDSCH 1610 for the UE 1614. The initial access information message 1602 may also contain information that is carried in PBCH, such as SFN, cell barred, intra frequency selection, spare, half-frame bit and/or MSB of SSB index, etc. Similarly, a gap 1608 may be configured between initial access information messages that are transmitted from different beams of the base station 1612 (e.g., between beam n and beam n+1) to enable the base station 1612 to perform beam switching, such as described in connection with FIGS. 9 and 10. Then, the base station 1612 may transmit the SIB1 PDSCH 1610 to the UE 1614 after transmitting the initial access message 1602, such as shown at 1618.

In another aspect of the present disclosure, for the UE 1614 to decode the DCI 1607 (e.g., the initial access information message 1602) within the CORESET 1606, the UE 1614 may be configured to determine or identify one or more parameters associated with the CORESET 1606. For example, the one or more parameters associated with the CORESET 1606 may include a PDCCH format, number of candidates, aggregation level (AL), CORESET BW, CORESET duration, and/or search space related parameter(s), etc. In one example, the one or more parameters associated with the CORESET 1606 may be defined for the wireless network, such as in a specification. Thus, the UE 1614 may identify the one or more parameters associated with the CORESET 1606 based on the specification. In another example, the UE 1614 may be configured with multiple BW options, such that the UE 1614 may blind detect the CORESET 1606 or the one or more parameters associated with the CORESET 1606 based on the multiple BW options. In another example, the base station 1612 may indicate the one or more parameters associated with the CORESET 1606 to the UE 1614 in the synchronization signal 1604, where the indication may be implicit.

In some examples, the base station 1612 may dedicate the CORESET 1606 and/or the search space to carry the initial access information message 1602 without carrying other messages. In other examples, the base station 1612 may configure the CORESET 1606 and/or the search space to carry the initial access information message 1602 with other DCIs/messages.

In some examples, the PDCCH candidates that are used for the DCI and/or DCI size may be configured to be different per beam and/or per cell, which may enable per beam and/or per cell customization as the message is not carried in PBCH (e.g., the PBCH may be fixed in size). Thus, the base station 1612 may use PDCCH to convey some information (e.g., PBCH related information) to the UE 1614, e.g., to convey cell barred, etc.

By including the DCI 1607 in the CORESET 1606, DCIs transmitted from different cells and/or beams may be configured to have different DCI locations, such that interference between initial access information messages transmitted from different cells and/or beams may be reduced. For example, as shown at 1615, the DCI 1607 may locate at different places within the CORESET 1606 for different beams (e.g., beam n and beam n+1). As such, the DCI location may be beam dependent and/or cell dependent. The mapping between the DCI location and a cell or a TRP (e.g., cell-ID/TRP-ID) may be specified for receiving devices (e.g., UEs). In addition, the base station 1612 may be able to multiplex other search spaces in a same CORESET (e.g., 1606), and the base station 1612 may be able to convey some information using the PDCCH candidate location and/or the DCI size. For example, if the DCI 1607 is transmitted by the base station 1612 at a first location within the CORESET 1606, it may indicate a first information, whereas if the DCI 1607 is transmitted by the base station 1612 at a second location within the CORESET 1606, it may indicate a second information, etc. In some examples, the UE initial access complexity may increase when the initial access information message 1602 is used/configured.

In another aspect of the present disclosure, an initial access information message (e.g., 1402) may be carried or transmitted using a message similar to DCI, such as described in connection with FIG. 16, and the initial access information message may further be split into multiple parts, such as split into two parts (e.g., a first DCI portion and a second DCI portion). The first part of the DCI may include information that a UE decodes once, such as the SFN, cell barred, etc., and the second part of the DCI may include other information not included in the first part of DCI (e.g., other MIB/PBCH content). The first DCI and the second DCI may be transmitted in a same CORESET. As such, after a UE decodes the first part of the DCI, the UE may skip decoding the first part of DCI in its subsequent communication. This may reduce amount of information decoded by the UE.

Figure 17:
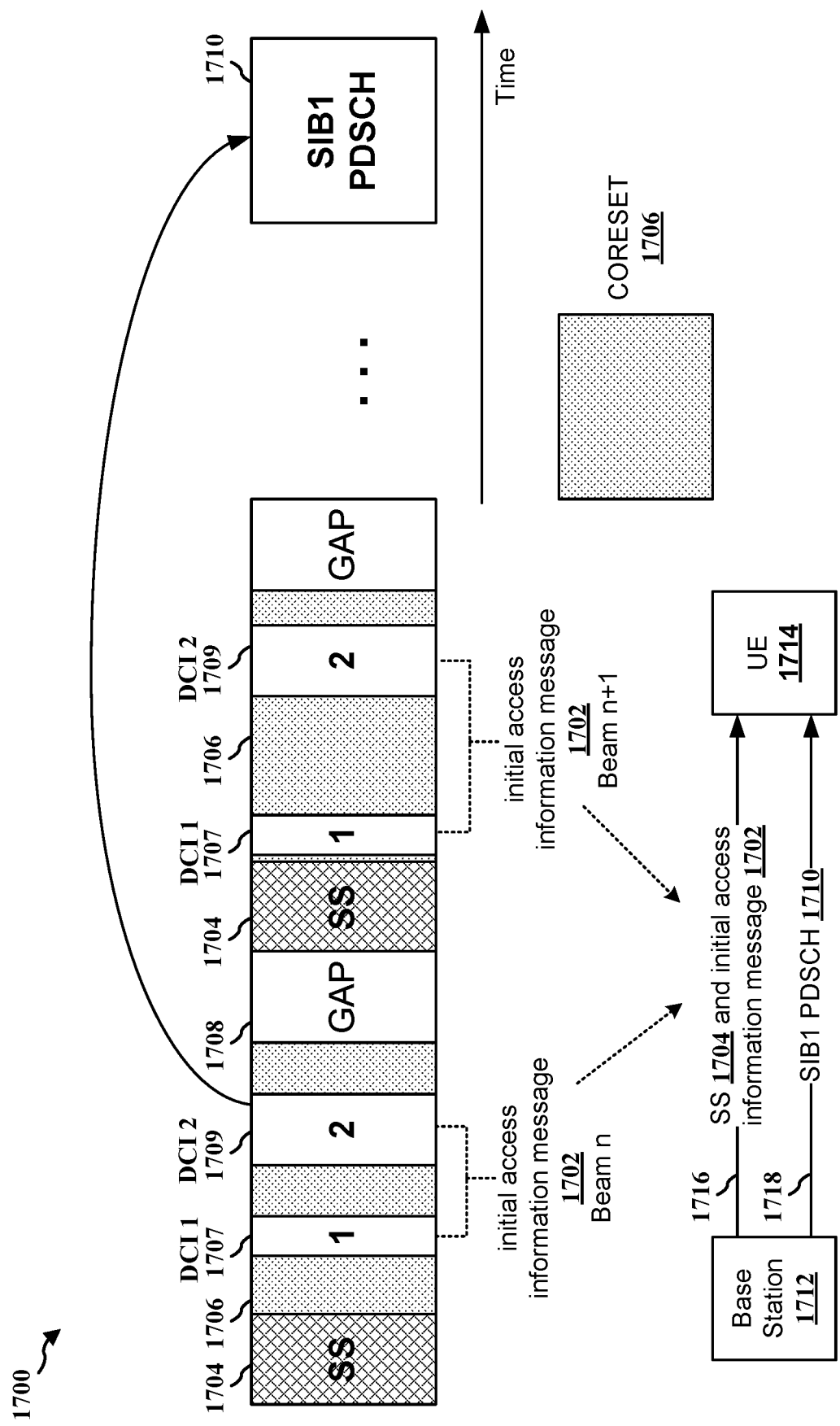
FIG. 17 is a diagram illustrating an example of an initial access information message that is carried using a message similar to DCI and is split into two parts according to aspects of the present disclosure.

FIG. 17 is a diagram 1700 illustrating an example of an initial access information message that may be carried using a message similar to DCI and may be split into two parts. An initial access information message 1702 (e.g., a MIB, DCI and PBCH combined block) may include a first DCI 1707 and a second DCI 1709. Then, a base station 1712 may transmit the initial access information message 1702 separately to a UE 1714 through the first DCI 1707 and the second DCI 1709, such as shown at 1716. The first DCI 1707 (e.g., the first part of the initial access information message 1702) may contain information in which the UE 1714 may decode once (e.g., SFN, cell barred indication), and the second DCI 1709 may contain other or rest of the information not included in the first DCI 1707, such as information in which the UE 1714 may decode more than once and/or information related to scheduling of a SIB PDSCH 1710. The base station 1712 may transmit the first DCI 1707 and the second DCI 1709 to the UE 1714 separately, such as within a CORESET 1706 that follows a synchronization signal (SS) 1704 (e.g., PSS 404 and/or SSS 408). In addition, the base station 1712 may apply different RNTIs to different DCIs. For example, the base station 1712 may apply a first RNTI to the first DCI 1707 and a second RNTI to the second DCI 1709. Similarly, a gap 1708 may be configured between initial access information messages that are transmitted from different beams of the base station 1712 (e.g., between beam n and beam n+1) to enable the base station 1712 to perform beam switching, such as described in connection with FIGS. 9 and 10. Then, the base station 1712 may transmit the SIB1 PDSCH 1710 to the UE 1714 after transmitting the initial access message 1702, such as shown at 1718.

As described in connection with FIG. 16, for the UE 1714 to decode the first DCI 1707 and/or the second DCI 1709 within the CORESET 1706, the UE 1714 may be configured to determine or identify one or more parameters associated with the CORESET 1706. For example, the one or more parameters associated with the CORESET 1706 may include a PDCCH format, number of candidates, aggregation level (AL), CORESET BW, CORESET duration, and/or search space related parameter(s), etc. In one example, the one or more parameters associated with the CORESET 1706 may be defined for the wireless network, such as in a specification. Thus, the UE 1714 may identify the one or more parameters associated with the CORESET 1706 based on the specification. In another example, the UE 1714 may be configured with multiple BW options, such that the UE 1714 may blind detect the CORESET 1706 or the one or more parameters associated with the CORESET 1706 based on the multiple BW options. In another example, the base station 1712 may indicate the one or more parameters associated with the CORESET 1706 to the UE 1714 in the synchronization signal 1704, where the indication may be implicit.

In some examples, the base station 1712 may dedicate the CORESET 1706 and/or the search space to carry the initial access information message 1702 (e.g., the first DCI 1707 and the second DCI 1709) without carrying other messages. In other examples, the base station 1712 may configure the CORESET 1706 and/or the search space to carry the initial access information message 1702 with other DCIs/messages.

In some examples, the PDCCH candidates that are used for the DCI and/or DCI size may be configured to be different per beam and/or per cell, which may enable per beam and/or per cell customization as the message is not carried in PBCH (e.g., the PBCH may be fixed in size). Thus, the base station 1712 may use PDCCH to convey some information (e.g., PBCH related information) to the UE 1714, e.g., to convey cell barred, etc.

By using an initial access information message 1702 including multiple DCIs (e.g., the first DCI 1707 and the second DCI 1709) and transmitting the initial access information message 1702 in the CORESET 1706, initial access information messages transmitted from different cells and/or beams may be configured to have different DCI locations, such that interference between initial access information messages transmitted from different cells and/or beams may be reduced. For example, the first DCI 1707 and/or the second DCI 1709 may locate at different places within the CORESET 1706 for different beams (e.g., beam n and beam n+1). As such, the DCI location may be beam dependent and/or cell dependent. The mapping between the DCI location and a cell or a TRP (e.g., cell-ID/TRP-ID) may be specified for receiving devices (e.g., UEs). In addition, the base station 1712 may be able to multiplex other search spaces in a same CORESET (e.g., 1706), and the base station 1712 may be able to convey some information using the PDCCH candidate location and/or the DCI size. For example, if the first DCI 1707 and/or the second DCI 1709 is transmitted by the base station 1712 at a first location within the CORESET 1706, it may indicate a first information, whereas if the first DCI 1707 and/or the second DCI 1709 is transmitted by the base station 1712 at a second location within the CORESET 1706, it may indicate a second information, etc. In some examples, the UE initial access complexity may increase when the initial access information message 1702 is used/configured.

In another aspect of the present disclosure, for the initial access information message 1502 discussed in connection with FIG. 15 and the initial access information message 1602 discussed in connection with FIG. 16, if the periodicity of the SIB1 PDSCH scheduling information, such as information included in a DCI format 1_0 (e.g., the DCI 602), is different from the periodicity of the other information, such as information included in MIB/PBCH (e.g., in the PBCH 502), a base station (e.g., 1512, 1612) may indicate to a UE (e.g., 1514, 1614) the presence of either information in a current transmission occasion. For example, when some information in PBCH is expected to be read by the UE less frequently or more frequently, the base station may determine not to include some information in some transmissions (e.g., to reduce transmission overhead). FIG. 12C illustrates an example 1200C in which MIB information 1252 may be transmitted at a more frequent periodicity than the combined block/channel/message 1250 that includes the SIB1 PDSCH scheduling information. For example, the base station may transmit SFN in one initial access information message, and the base station may skip transmitting the SFN for subsequent N initial access information messages. As such, a base station may indicate to a UE which information is transmitted by the base station in an initial access information message. In one example, the base station may transmit the indication implicitly in SS and/or DMRS (e.g., DMRS used for PBCH or PDCCH). In other words, the base station may inform the UE which information the base station is trying to convey at a time and/or frequency location.

Figure 18:
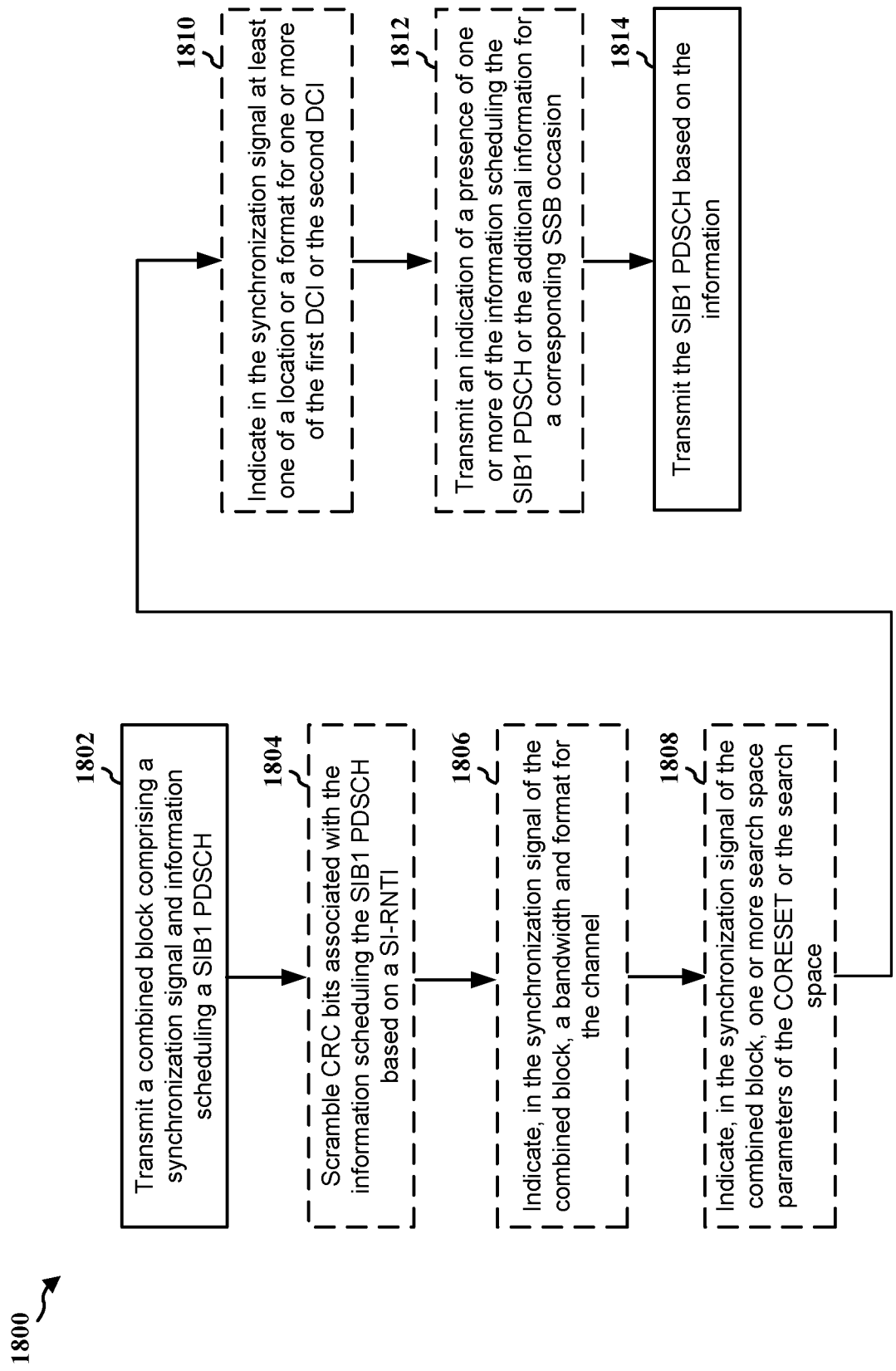
FIG. 18 is a flowchart of a method of wireless communication in accordance with aspects presented herein.

FIG. 18 is a flowchart 1800 of a method of wireless communication. The method may be performed by a base station or a component of a base station (e.g., the base station 102, 180, 310, 1512, 1612, 1712; a processing system, which may include the memory 376 and which may be the entire base station 310 or a component of the base station 310, such as the TX processor 316 the RX processor 370, and/or the controller/processor 375). Optional aspects are illustrated with a dashed line. The method may enable the base station to transmit information associated with PBCH/MIB and information associated with DCI in a combined block to enhance the initial access procedure for a UE.

At 1802, the base station may transmit a combined block comprising a synchronization signal and information scheduling a SIB1 PDSCH, such as described in connection with FIGS. 15 to 17. For example, at 1516, the base station 1512 may transmit an initial access information message 1502 to the UE 1514 following a synchronization signal 1504, where the initial access information message 1502 may include information scheduling a SIB1 PDSCH. The transmission of the combined block may be performed, e.g. by the SS and SIB1 component 1940 and/or the transmission component 1934 of the apparatus 1902 in FIG. 19. The combined block may include a PSS (e.g., 404), and an SSS (e.g., 408).

At 1804, the base station may scramble CRC bits associated with the information scheduling the SIB1 PDSCH based on an SI-RNTI, such as described in connection with FIG. 14. For example, the initial access information message 1402 may be CRC scrambled with SI-RNTI. The CRC scrambling may be performed, e.g. by the CRC scrambling component 1942 of the apparatus 1902 in FIG. 19.

In one example, the combined block may include a channel that carries the information scheduling the SIB1 PDSCH and one or more of: an SFN, a beam index, or barred cell information, such as described in connection with FIG. 14. In such an example, the channel may include a PBCH that includes the information scheduling the SIB1 PDSCH. In such an example, a bandwidth and format for the channel may be defined.

At 1806, the base station may indicate, in the synchronization signal of the combined block, a bandwidth and format for the channel, such as described in connection with FIG. 15. For example, the base station 1512 may indicate the BW of the PBCH 1506 to the UE 1514 in the synchronization signal 1504. The indication of the bandwidth and format for the channel may be performed, e.g. by the BW and format indication component 1946 and/or the transmission component 1934 of the apparatus 1902 in FIG. 19.

In one aspect, the combined block may include a PDCCH message that carries the information scheduling the SIB1 PDSCH and additional broadcast information comprises one or more of: an SFN, a beam index, or barred cell information, such as described in connection with FIGS. 14 and 16. The base station may transmit the PDCCH message carrying the information scheduling the SIB 1 PDSCH and the additional broadcast information on a CORESET or a search space, where the CORESET or the search space may include one or more search space parameters that are defined. In one example, the one or more search space parameters may include at least one of a PDCCH format, a number of candidates, an aggregation level, a CORESET bandwidth, or a duration.

At 1808, the base station may indicate, in the synchronization signal of the combined block, one or more search space parameters of the CORESET or the search space, such as described in connection with FIG. 16. For example, the base station 1612 may indicate the one or more parameters associated with the CORESET 1606 to the UE 1614 in the synchronization signal 1604. The indication of the one or more search space parameters may be performed, e.g. by the search space indication component 1948 and/or the transmission component 1934 of the apparatus 1902 in FIG. 19. The one or more search space parameters may include at least one of a PDCCH format, a number of candidates, an aggregation level, a CORESET bandwidth, or a duration.

In one example, the CORESET or the search space may be dedicated for the PDCCH message. In another example, the CORESET or the search space may carry at least one additional control message. For example, the PDCCH message may include DCI associated a different PDCCH candidate for different beams or different cells. In such an example, the PDCCH message that includes the DCI associated may have a different size for different beams or different cells. In another example, when the PDCCH message includes DCI, the DCI may be based on a PDCCH candidate or a size that indicates additional information for a cell.

In another aspect, as described in connection with FIG. 17, the PDCCH message may include a first DCI comprising the additional broadcast information and a second DCI comprising the information scheduling the SIB1 PDSCH. In one example, the base station may transmit the first DCI and the second DCI in a same CORESET. In another example, the first DCI and the second DCI may be based on a same RNTI, or the first DCI may be based on a different RNTI than the second DCI. In addition, one or more of the first DCI or the second DCI may include a location or a format that is defined.

At 1810, the base station may indicate in the synchronization signal at least one of a location or a format for one or more of the first DCI or the second DCI, such as described in connection with FIG. 17. For example, the base station 1712 may indicate the one or more parameters associated with the CORESET 1706 to the UE 1714 in the synchronization signal 1704. The indication of the location or the format for one or more of the first DCI or the second DCI may be performed, e.g. by the DCI indication component 1950 and/or the transmission component 1934 of the apparatus 1902 in FIG. 19.

In another aspect, the combined block may include a first SSB that the base station transmits in a first SSB occasion, where the first SSB may include the information scheduling the SIB1 PDSCH and additional information. Then, the base station may transmit a second SSB in a second SSB occasion, the second SSB may include the additional information without the information scheduling the SIB1 PDSCH.

At 1812, the base station may transmit an indication of a presence of one or more of the information scheduling the SIB1 PDSCH or the additional information for a corresponding SSB occasion. The indication of the information scheduling the SIB1 PDSCH or the additional information for a corresponding SSB occasion may be performed, e.g. by the scheduling indication component 1952 and/or the transmission component 1934 of the apparatus 1902 in FIG. 19. For example, the base station may transmit the indication in one or more of the synchronization signal or a DMRS comprised in the first SSB or the second SSB.

At 1814, the base station may transmit the SIB1 PDSCH based on the information, such as described in connection with FIGS. 15 to 17. For example, at 1518, the base station 1512 may transmit the SIB1 PDSCH 1510 to the UE 1514 after transmitting the initial access message 1502. The transmission of the SIB1 PDSCH may be performed, e.g. by the SIB1 PDSCH component 1944 and/or the transmission component 1934 of the apparatus 1902 in FIG. 19.

Figure 19:
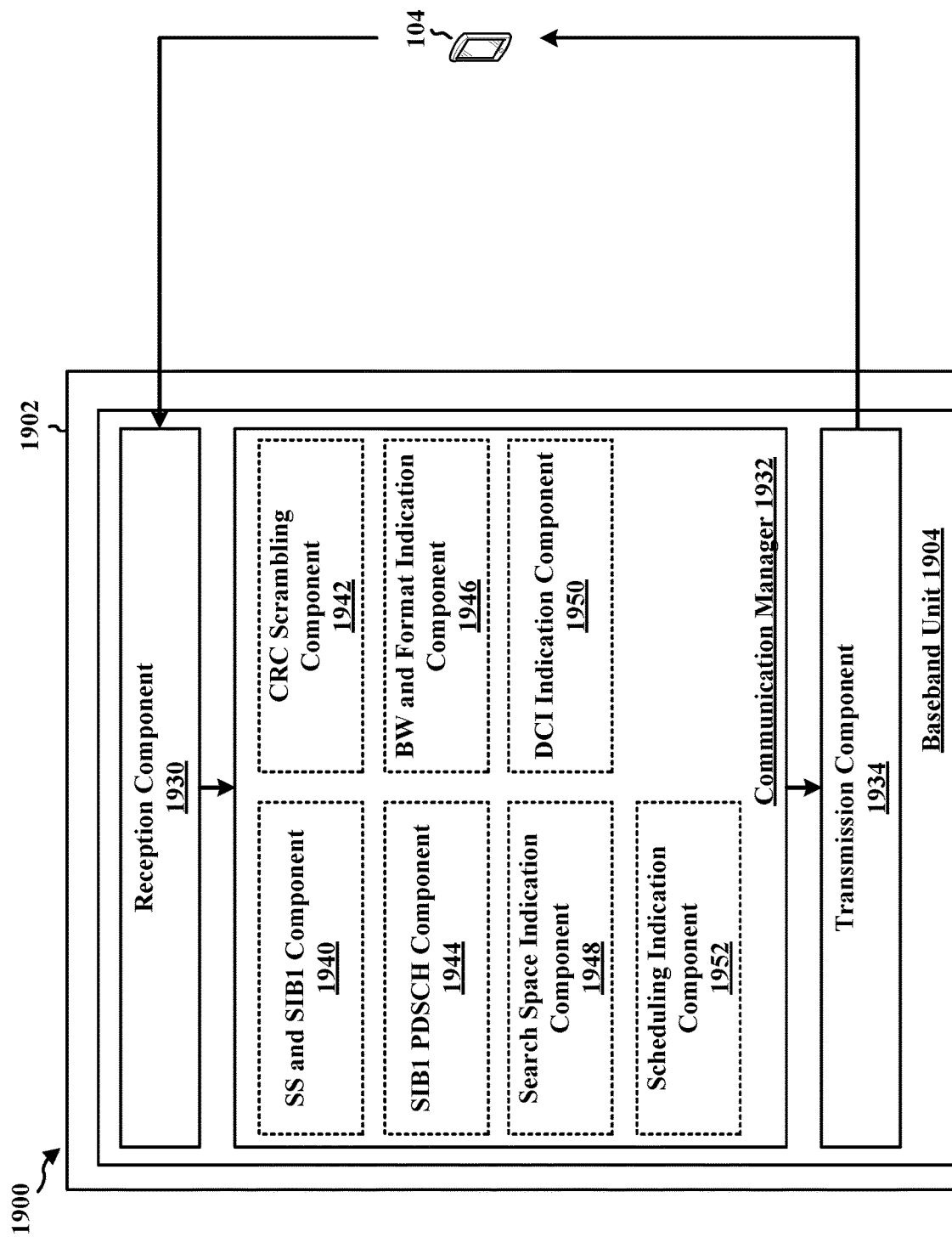
FIG. 19 is a diagram illustrating an example of a hardware implementation for an example apparatus in accordance with aspects presented herein.

FIG. 19 is a diagram 1900 illustrating an example of a hardware implementation for an apparatus 1902. The apparatus 1902 is a BS and includes a baseband unit 1904. The baseband unit 1904 may communicate through a cellular RF transceiver with the UE 104. The baseband unit 1904 may include a computer-readable medium/memory. The baseband unit 1904 is responsible for general processing, including the execution of software stored on the computer-readable medium/memory. The software, when executed by the baseband unit 1904, causes the baseband unit 1904 to perform the various functions described supra. The computer-readable medium/memory may also be used for storing data that is manipulated by the baseband unit 1904 when executing software. The baseband unit 1904 further includes a reception component 1930, a communication manager 1932, and a transmission component 1934. The communication manager 1932 includes the one or more illustrated components. The components within the communication manager 1932 may be stored in the computer-readable medium/memory and/or configured as hardware within the baseband unit 1904. The baseband unit 1904 may be a component of the BS 310 and may include the memory 376 and/or at least one of the TX processor 316, the RX processor 370, and the controller/processor 375.

The communication manager 1932 includes an SS and SIB1 component 1940 that is configured to transmit a combined block comprising a synchronization signal and information scheduling a SIB1 PDSCH, e.g., as described in connection with 1802 of FIG. 18. The communication manager 1932 further includes a CRC scrambling component 1942 that is configured to scramble CRC bits associated with the information scheduling the SIB1 PDSCH based on an SI-RNTI, e.g., as described in connection with 1804 of FIG. 18. The communication manager 1932 further includes a SIB1 PDSCH component 1944 that is configured to transmit the SIB1 PDSCH based on the information, e.g., as described in connection with 1814 of FIG. 18. The communication manager 1932 further includes a BW and format indication component 1946 that is configured to indicate, in the synchronization signal of the combined block, a bandwidth and format for the channel, e.g., as described in connection with 1806 of FIG. 18. The communication manager 1932 further includes a search space indication component 1948 that is configured to indicate, in the synchronization signal of the combined block, one or more search space parameters of the CORESET or the search space, e.g., as described in connection with 1808 of FIG. 18. The communication manager 1932 further includes a DCI indication component 1950 that is configured to indicate in the synchronization signal at least one of a location or a format for one or more of the first DCI or the second DCI, e.g., as described in connection with 1810 of FIG. 18. The communication manager 1932 further includes a scheduling indication component 1952 that is configured to transmit an indication of a presence of one or more of the information scheduling the SIB1 PDSCH or the additional information for a corresponding SSB occasion, e.g., as described in connection with 1812 of FIG. 18.

The apparatus may include additional components that perform each of the blocks of the algorithm in the aforementioned flowchart of FIG. 18. As such, each block in the aforementioned flowchart of FIG. 18 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1902, and in particular the baseband unit 1904, includes means for transmitting a combined block comprising a synchronization signal and information scheduling a SIB1 PDSCH (e.g., the SS and SINB1 component 1940 and/or the transmission component 1934). The apparatus 1902 includes means for transmitting the SIB1 PDSCH based on the information. The apparatus 1902 includes means for scrambling CRC bits associated with the information scheduling the SIB1 PDSCH based on an SI-RNTI (e.g., the CRC scrambling component 1942 and/or the transmission component 1934). The apparatus 1902 includes means for indicating, in the synchronization signal of the combined block, a bandwidth and format for the channel (e.g., the BW and format component 1946 and/or the transmission component 1934). The apparatus 1902 includes means for indicating, in the synchronization signal of the combined block, one or more search space parameters of the CORESET or the search space (e.g., the search space indication component 1948 and/or the transmission component 1934). The apparatus 1902 includes means for indicating in the synchronization signal at least one of a location or a format for one or more of the first DCI or the second DCI (e.g., the DCI Indication component 1950 and/or the transmission component 1934). The apparatus 1902 includes means for transmitting an indication of a presence of one or more of the information scheduling the SIB1 PDSCH or the additional information for a corresponding SSB occasion (e.g., the SINB1 PDSCH component 1944 and/or the transmission component 1934).

The aforementioned means may be one or more of the aforementioned components of the apparatus 1902 configured to perform the functions recited by the aforementioned means. As described supra, the apparatus 1902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 20:
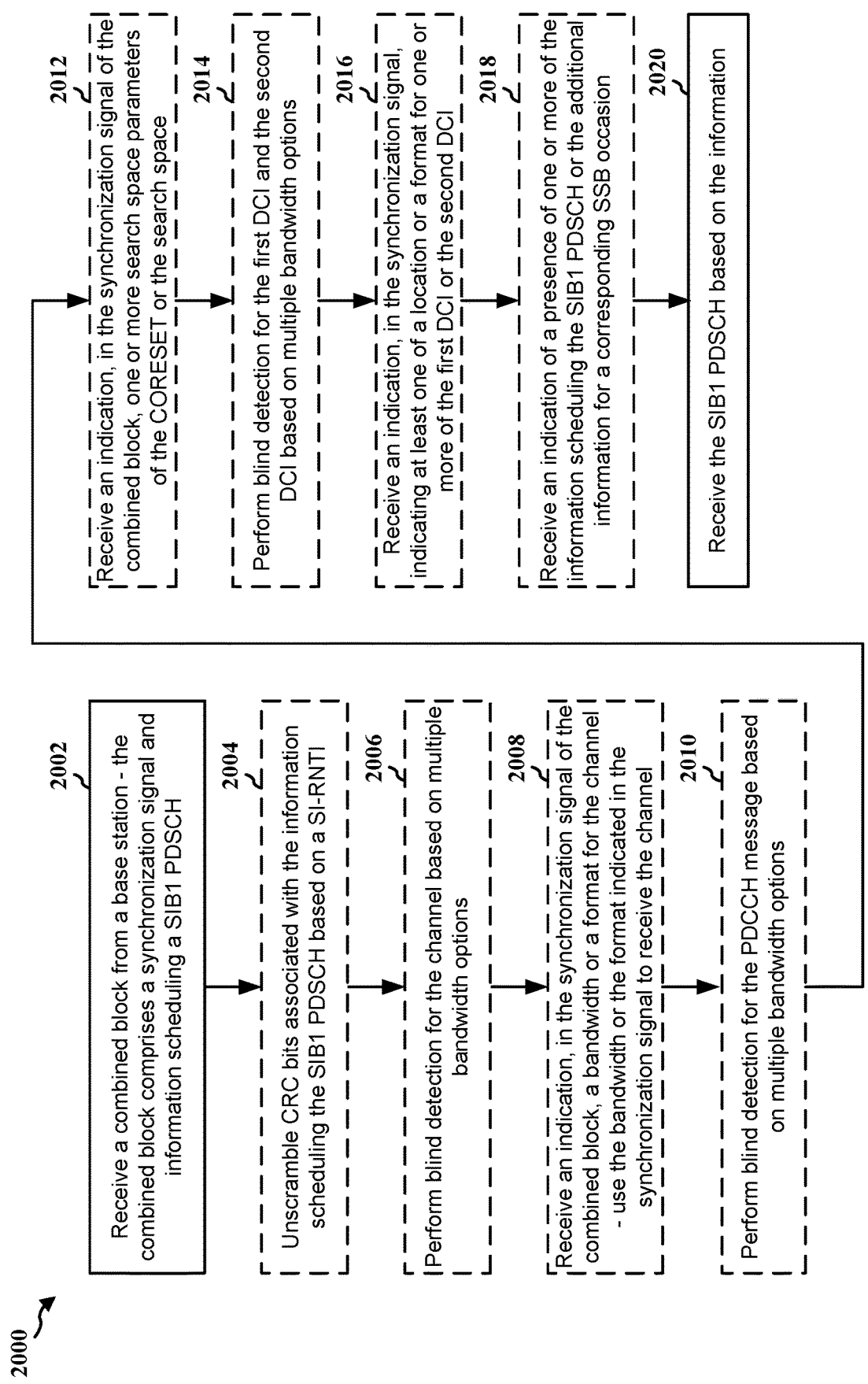
FIG. 20 is a flowchart of a method of wireless communication in accordance with aspects presented herein.

FIG. 20 is a flowchart 2000 of a method of wireless communication. The method may be performed by a UE or a component of a UE (e.g., the UE 104, 350, 1514, 1614, 1714; a processing system, which may include the memory 360 and which may be the entire UE 350 or a component of the UE 350, such as the TX processor 368, the RX processor 356, and/or the controller/processor 359). Optional aspects are illustrated with a dashed line. The method may enable the UE to receive information associated with PBCH/MIB and information associated with DCI in a combined block to enhance the initial access procedure for the UE 104.

At 2002, the UE may receive a combined block from a base station, the combined block comprising a synchronization signal and information scheduling a SIB1 PDSCH, such as described in connection with FIGS. 15 to 17. For example, at 1516, the UE 1514 may receive an initial access information message 1502 from the base station 1512 following a synchronization signal 1504, where the initial access information message 1502 may include information scheduling a SIB1 PDSCH. The reception of the combined block may be performed, e.g. by the SS and SIB1 component 2140 and/or the reception component 2130 of the apparatus 2102 in FIG. 21. The combined block may include a PSS (e.g., 404), and an SSS (e.g., 408).

At 2004, the UE may unscramble CRC bits associated with the information scheduling the SIB1 PDSCH based on an SI-RNTI, such as described in connection with FIG. 14. For example, the initial access information message 1402 may be CRC scrambled with SI-RNTI. The CRC unscrambling may be performed, e.g. by the CRC unscrambling component 2142 of the apparatus 2102 in FIG. 21.

In one example, the combined block may include a channel that carries the information scheduling the SIB1 PDSCH and one or more of: an SFN, a beam index, or barred cell information, such as described in connection with FIG. 14. In such an example, the channel may include a PBCH that includes the information scheduling the SIB1 PDSCH. In such an example, a bandwidth and format for the channel may be defined.

At 2006, the UE may perform blind detection for the channel based on multiple bandwidth options, such as described in connection with FIG. 15. For example, the UE 1514 may blind detect the BW of the PBCH 1506 based on the multiple BW options. The blind detection may be performed, e.g. by the blind detection component 2146 of the apparatus 2102 in FIG. 21.

At 2008, the UE may receive an indication, in the synchronization signal of the combined block, a bandwidth or a format for the channel, and the UE may use the bandwidth or the format indicated in the synchronization signal to receive the channel, such as described in connection with FIG. 15. For example, the base station 1512 may indicate the BW of the PBCH 1506 to the UE 1514 in the synchronization signal 1504. The process and/or reception of the indication may be performed, e.g. by the indication process component 2148 and/or the reception component 2130 of the apparatus 2102 in FIG. 21.

In one aspect, the combined block may include a PDCCH message that carries the information scheduling the SIB1 PDSCH and additional broadcast information comprises one or more of: an SFN, a beam index, or barred cell information, such as described in connection with FIGS. 14 and 16. The UE may receive the PDCCH message carrying the information scheduling the SIB 1 PDSCH and the additional broadcast information on a CORESET or search space, where the CORESET or the search space comprises one or more search space parameters that are defined. In one example, the one or more search space parameters may include at least one of a PDCCH format, a number of candidates, an aggregation level, a CORESET bandwidth, or a duration.

At 2010, the UE may perform blind detection for the PDCCH message based on multiple bandwidth options, such as described in connection with FIGS. 16 and 17. The blind detection may be performed, e.g. by the blind detection component 2146 and/or the transmission component 2134 of the apparatus 2102 in FIG. 21.

At 2012, the UE may receive an indication, in the synchronization signal of the combined block, one or more search space parameters of the CORESET or the search space, such as described in connection with FIGS. 16 and 17. For example, the base station 1612 may indicate the one or more parameters associated with the CORESET 1606 to the UE 1614 in the synchronization signal 1604, where the indication may be implicit. The process and/or reception of the indication may be performed, e.g. by the indication process component 2148 and/or the reception component 2130 of the apparatus 2102 in FIG. 21. In one example, the one or more search space parameter may include at least one of a PDCCH format, a number of candidates, an aggregation level, a CORESET bandwidth, or a duration.

In some examples, the CORESET or the search space may be dedicated for the PDCCH message. In other example, the CORESET or the search space may carry at least one additional control message.

In another example, the PDCCH message may include DCI associated a different PDCCH candidate for different beams or different cells. In another example, the PDCCH message may include DCI associated having a different size for different beams or different cells. In another example, the PDCCH message may include DCI, and the DCI is based on a PDCCH candidate or a size that indicates additional information for the cell.

In another aspect, the PDCCH message may include first DCI comprising the additional broadcast information and a second DCI comprising the information scheduling the SIB1 PDSCH, such as described in connection with FIG. 17. In one example, the UE may receive the first DCI and the second DCI in a same CORESET. In another example, the first DCI and the second DCI may be based on a same RNTI, or the first DCI is based on a different RNTI than the second DCI. One or more of the first DCI or the second DCI may include a location or a format that is defined.

At 2014, the UE may performing blind detection for the first DCI and the second DCI based on multiple bandwidth options, such as described in connection with FIG. 17. For example, the UE 1714 may blind detect the CORESET 1706 or the one or more parameters associated with the CORESET 1706. The blind detection may be performed, e.g. by the blind detection component 2146 and/or the transmission component 2134 of the apparatus 2102 in FIG. 21.

At 2016, the UE may receive an indication, in the synchronization signal, indicating at least one of a location or a format for one or more of the first DCI or the second DCI, such as described in connection with FIG. 17. The process and/or reception of the indication may be performed, e.g. by the indication process component 2148 and/or the reception component 2130 of the apparatus 2102 in FIG. 21.

In another aspect, the combined block may include a first SSB that the UE receives in a first SSB occasion, where the first SSB may include the information scheduling the SIB1 PDSCH and additional information. Then, the UE may receive a second SSB in a second SSB occasion, where the second SSB may include the additional information without the information scheduling the SIB1 PDSCH.

At 2018, the UE may receive an indication of a presence of one or more of the information scheduling the SIB1 PDSCH or the additional information for a corresponding SSB occasion. The process and/or reception of the indication may be performed, e.g. by the indication process component 2148 and/or the reception component 2130 of the apparatus 2102 in FIG. 21. In one example, the UE may receive the indication in one or more of the synchronization signal or a DMRS comprised in the first SSB or the second SSB.

At 2020, the UE may receive the SIB1 PDSCH based on the information, such as described in connection with FIGS. 15 to 17. For example, at 1518, the UE 1514 may receive the SIB1 PDSCH 1510 from the base station 1512 after receiving the initial access message 1502. The process and/or reception of the indication may be performed, e.g. by the indication process component 2148 and/or the reception component 2130 of the apparatus 2102 in FIG. 21.

Figure 21:
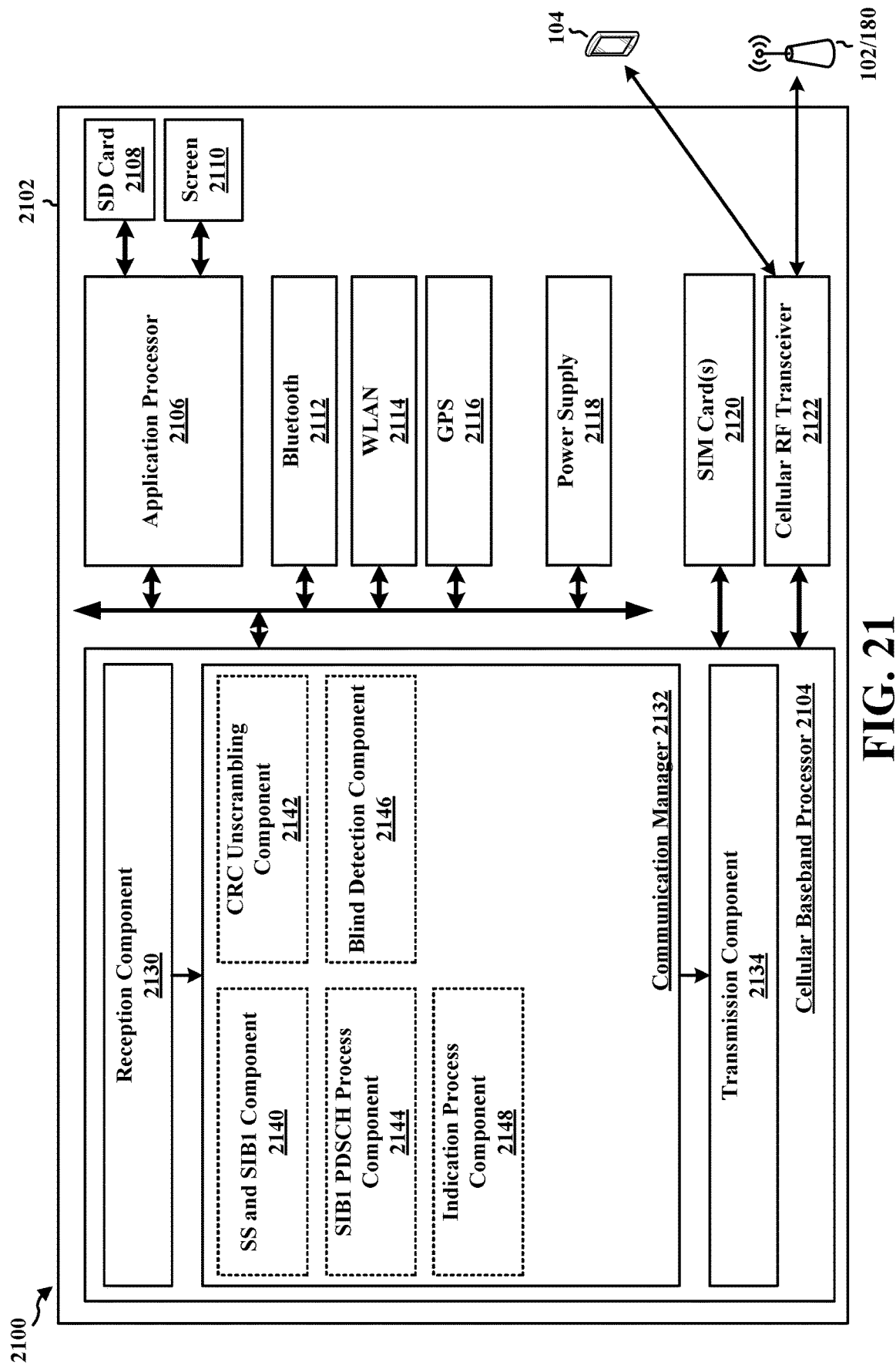
FIG. 21 is a diagram illustrating an example of a hardware implementation for an example apparatus in accordance with aspects presented herein.

FIG. 21 is a diagram 2100 illustrating an example of a hardware implementation for an apparatus 2102. The apparatus 2102 is a UE and includes a cellular baseband processor 2104 (also referred to as a modem) coupled to a cellular RF transceiver 2122 and one or more subscriber identity modules (SIM) cards 2120, an application processor 2106 coupled to a secure digital (SD) card 2108 and a screen 2110, a Bluetooth module 2112, a wireless local area network (WLAN) module 2114, a Global Positioning System (GPS) module 2116, and a power supply 2118. The cellular baseband processor 2104 communicates through the cellular RF transceiver 2122 with the UE 104 and/or BS 102/180. The cellular baseband processor 2104 may include a computer-readable medium/memory. The computer-readable medium/memory may be non-transitory. The cellular baseband processor 2104 is responsible for general processing, including the execution of software stored on the computer-readable medium/memory. The software, when executed by the cellular baseband processor 2104, causes the cellular baseband processor 2104 to perform the various functions described supra. The computer-readable medium/memory may also be used for storing data that is manipulated by the cellular baseband processor 2104 when executing software. The cellular baseband processor 2104 further includes a reception component 2130, a communication manager 2132, and a transmission component 2134. The communication manager 2132 includes the one or more illustrated components. The components within the communication manager 2132 may be stored in the computer-readable medium/memory and/or configured as hardware within the cellular baseband processor 2104. The cellular baseband processor 2104 may be a component of the UE 350 and may include the memory 360 and/or at least one of the TX processor 368, the RX processor 356, and the controller/processor 359. In one configuration, the apparatus 2102 may be a modem chip and include just the baseband processor 2104, and in another configuration, the apparatus 2102 may be the entire UE (e.g., see 350 of FIG. 3) and include the aforediscussed additional modules of the apparatus 2102.

The communication manager 2132 includes an SS and SIB component 2140 that is configured to receive a combined block from a base station, where the combined block comprises a synchronization signal and information scheduling a SIB1 PDSCH, e.g., as described in connection with 2002 of FIG. 20. The communication manager 2132 further includes a CRC unscrambling component 2142 that is configured to unscramble CRC bits associated with the information scheduling the SIB1 PDSCH based on an SI-RNTI, e.g., as described in connection with 2004 of FIG. 20. The communication manager 2132 further includes a SIB1 PDSCH process component 2144 that is configured to receive the SIB1 PDSCH based on the information, e.g., as described in connection with 2020 of FIG. 20. The communication manager 2132 further includes a blind detection component 2146 that is configured to perform blind detection for the channel based on multiple bandwidth options, to perform blind detection for the PDCCH message based on multiple bandwidth options, and/or to perform blind detection for the first DCI and the second DCI based on multiple bandwidth options, e.g., as described in connection with 2006, 2010, and/or 2014 of FIG. 20. The communication manager 2132 further includes an indication process component 2148 that is configured to receive an indication, in the synchronization signal of the combined block, a bandwidth or a format for the channel, one or more search space parameters of the CORESET or the search space, at least one of a location or a format for one or more of the first DCI or the second DCI, and/or a presence of one or more of the information scheduling the SIB1 PDSCH or the additional information for a corresponding SSB occasion, e.g., as described in connection with 2008, 2012, 2016 and/or 2018 of FIG. 20.

The apparatus may include additional components that perform each of the blocks of the algorithm in the aforementioned flowchart of FIG. 20. As such, each block in the aforementioned flowchart of FIG. 20 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 2102, and in particular the cellular baseband processor 2104, includes means for receiving a combined block from a base station, the combined block comprising a synchronization signal and information scheduling a SIB1 PDSCH (e.g., the SS and SIB1 component 2140 and/or the reception component 2130). The apparatus 2102 includes means for receiving the SIB1 PDSCH based on the information (e.g., the SIB1 PDSCH component 2144 and/or the reception component 2130). The apparatus 2102 includes means for unscrambling CRC bits associated with the information scheduling the SIB1 PDSCH based on an SI-RNTI (e.g., the CRC unscrambling component 2142). The apparatus 2102 includes means for performing blind detection for the channel based on multiple bandwidth options (e.g., the blind detection component 2142). The apparatus 2102 includes means for receiving an indication, in the synchronization signal of the combined block, a bandwidth or a format for the channel; and means for using the bandwidth or the format indicated in the synchronization signal to receive the channel (e.g., the indication process component 2148 and/or the reception component 2130). The apparatus 2102 includes means for performing blind detection for the PDCCH message based on multiple bandwidth options (e.g., the blind detection component 2142). The apparatus 2102 includes means for receiving an indication, in the synchronization signal of the combined block, one or more search space parameters of the CORESET or the search space (e.g., the indication process component 2148 and/or the reception component 2130). The apparatus 2102 includes means for performing blind detection for the first DCI and the second DCI based on multiple bandwidth options (e.g., the blind detection component 2142). The apparatus 2102 includes means for receiving an indication, in the synchronization signal, indicating at least one of a location or a format for one or more of the first DCI or the second DCI (e.g., the indication process component 2148 and/or the reception component 2130). The apparatus 2102 includes means for receiving an indication of a presence of one or more of the information scheduling the SIB1 PDSCH or the additional information for a corresponding SSB occasion (e.g., the indication process component 2148 and/or the reception component 2130).

The aforementioned means may be one or more of the aforementioned components of the apparatus 2102 configured to perform the functions recited by the aforementioned means. As described supra, the apparatus 2102 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The following examples set forth additional aspects and are illustrative only and aspects thereof may be combined with aspects of other embodiments or teaching described herein, without limitation.

Aspect 1 is a method of wireless communication at a base station, comprising: transmitting a combined block comprising a synchronization signal and information scheduling a SIB1 PDSCH; and transmitting the SIB1 PDSCH based on the information.

In aspect 2, the method of aspect 1 further comprises: scrambling CRC bits associated with the information scheduling the SIB1 PDSCH based on an SI-RNTI.

In aspect 3, the method of aspect 1 or aspect 2 further includes that the combined block comprises a PSS, and an SSS.

In aspect 4, the method of any of aspects 1-3 further includes that the combined block comprises a channel that carries the information scheduling the SIB1 PDSCH and one or more of: an SFN, a beam index, or barred cell information.

In aspect 5, the method of any of aspects 1-4 further includes that the channel comprises a PBCH that includes the information scheduling the SIB1 PDSCH.

In aspect 6, the method of any of aspects 1-5 further includes that a bandwidth and format for the channel are defined.

In aspect 7, the method of any of aspects 1-6 further comprises: indicating, in the synchronization signal of the combined block, a bandwidth and format for the channel.

In aspect 8, the method of any of aspects 1-7 further includes that the combined block comprises a PDCCH message that carries the information scheduling the SIB1 PDSCH and additional broadcast information comprising one or more of: an SFN, a beam index, or barred cell information.

In aspect 9, the method of any of aspects 1-8 further includes that the base station transmits the PDCCH message carrying the information scheduling the SIB 1 PDSCH and the additional broadcast information on a CORESET or a search space.

In aspect 10, the method of any of aspects 1-9 further includes that the CORESET or the search space comprising one or more search space parameters that are defined.

In aspect 11, the method of any of aspects 1-10 further includes that the one or more search space parameters includes at least one of a PDCCH format, a number of candidates, an aggregation level, a CORESET bandwidth, or a duration.

In aspect 12, the method of any of aspects 1-11 further comprises:
  indicating, in the synchronization signal of the combined block, one or more search space parameters of the CORESET or the search space.

In aspect 13, the method of any of aspects 1-12 further includes that the one or more search space parameters includes at least one of a PDCCH format, a number of candidates, an aggregation level, a CORESET bandwidth, or a duration.

In aspect 14, the method of any of aspects 1-13 further includes that the CORESET or the search space is dedicated for the PDCCH message.

In aspect 15, the method of any of aspects 1-14 further includes that the CORESET or the search space carries at least one additional control message.

In aspect 16, the method of any of aspects 1-15 further includes that the PDCCH message comprises DCI associated a different PDCCH candidate for different beams or different cells.

In aspect 17, the method of any of aspects 1-16 further includes that the PDCCH message comprises DCI associated having a different size for different beams or different cells.

In aspect 18, the method of any of aspects 1-17 further includes that the PDCCH message comprises DCI, and the DCI is based on a PDCCH candidate or a size that indicates additional information for a cell.

In aspect 19, the method of any of aspects 1-18 further includes that the PDCCH message comprises first DCI comprising the additional broadcast information and a second DCI comprising the information scheduling the SIB1 PDSCH.

In aspect 20, the method of any of aspects 1-19 further includes that the base station transmits the first DCI and the second DCI in a same CORESET.

In aspect 21, the method of any of aspects 1-20 further includes that the first DCI and the second DCI are based on a same RNTI.

In aspect 22, the method of any of aspects 1-21 further includes that the first DCI is based on a different RNTI than the second DCI.

In aspect 23, the method of any of aspects 1-22 further includes that one or more of the first DCI or the second DCI comprise a location or a format that is defined.

In aspect 24, the method of any of aspects 1-23 further comprises: indicating in the synchronization signal at least one of a location or a format for one or more of the first DCI or the second DCI.

In aspect 25, the method of any of aspects 1-24 further includes that the combined block comprises a first SSB that the base station transmits in a first SSB occasion, the first SSB comprising the information scheduling the SIB1 PDSCH and additional information, the method further comprises: transmitting a second SSB in a second SSB occasion, the second SSB comprising the additional information without the information scheduling the SIB1 PDSCH.

In aspect 26, the method of any of aspects 1-25 further comprises: transmitting an indication of a presence of one or more of the information scheduling the SIB1 PDSCH or the additional information for a corresponding SSB occasion.

In aspect 27, the method of any of aspects 1-26 further includes that the base station transmits the indication in one or more of the synchronization signal or a DMRS comprised in the first SSB or the second SSB.

Aspect 28 is an apparatus for wireless communication including at least one processor coupled to a memory and configured to implement a method as in any of aspects 1 to 27.

Aspect 29 is an apparatus for wireless communication including means for implementing a method as in any of aspects 1 to 27.

Aspect 30 is a non-transitory computer-readable medium storing computer executable code, where the code when executed by a processor causes the processor to implement a method as in any of aspects 1 to 27.

Aspect 31 is a method of wireless communication at a UE, comprising: receiving a combined block from a base station, the combined block comprising a synchronization signal and information scheduling a SIB1 PDSCH; and receiving the SIB1 PDSCH based on the information.

In aspect 32, the method of aspect 31 further comprises: unscrambling CRC bits associated with the information scheduling the SIB1 PDSCH based on an SI-RNTI.

In aspect 33, the method of aspect 32 or aspect 31 further includes that the combined block comprises a PSS and an SSS.

In aspect 34, the method of any of aspects 31-33 further includes that the combined block comprises a channel that carries the information scheduling the SIB1 PDSCH and one or more of: an SFN, a beam index, or barred cell information.

In aspect 35, the method of any of aspects 31-34 further includes that the channel comprises a PBCH that includes the information scheduling the SIB1 PDSCH.

In aspect 36, the method of any of aspects 31-35 further includes that a bandwidth and format for the channel are defined.

In aspect 37, the method of any of aspects 31-36 further comprises: performing blind detection for the channel based on multiple bandwidth options.

In aspect 38, the method of any of aspects 31-37 further comprises: receiving an indication, in the synchronization signal of the combined block, a bandwidth or a format for the channel; and using the bandwidth or the format indicated in the synchronization signal to receive the channel.

In aspect 39, the method of any of aspects 31-38 further includes that the combined block comprises a PDCCH message that carries the information scheduling the SIB1 PDSCH and additional broadcast information comprising one or more of: an SFN, a beam index, or barred cell information.

In aspect 40, the method of any of aspects 31-39 further includes that the UE receives the PDCCH message carrying the information scheduling the SIB 1 PDSCH and the additional broadcast information on a CORESET or search space.

In aspect 41, the method of any of aspects 31-40 further includes that the CORESET or the search space comprises one or more search space parameters that are defined.

In aspect 42, the method of any of aspects 31-41 further includes that the one or more search space parameters includes at least one of a PDCCH format, a number of candidates, an aggregation level, a CORESET bandwidth, or a duration.

In aspect 43, the method of any of aspects 31-42 further comprises: performing blind detection for the PDCCH message based on multiple bandwidth options.

In aspect 44, the method of any of aspects 31-43 further comprises: receiving an indication, in the synchronization signal of the combined block, one or more search space parameters of the CORESET or the search space.

In aspect 45, the method of any of aspects 31-44 further includes that the one or more search space parameters includes at least one of a PDCCH format, a number of candidates, an aggregation level, a CORESET bandwidth, or a duration.

In aspect 46, the method of any of aspects 31-45 further includes that the CORESET or the search space is dedicated for the PDCCH message.

In aspect 47, the method of any of aspects 31-46 further includes that the CORESET or the search space carries at least one additional control message.

In aspect 48, the method of any of aspects 31-47 further includes that the PDCCH message comprises DCI associated a different PDCCH candidate for different beams or different cells.

In aspect 49, the method of any of aspects 31-48 further includes that the PDCCH message comprises DCI associated having a different size for different beams or different cells.

In aspect 50, the method of any of aspects 31-49 further includes that the PDCCH message comprises DCI, and the DCI is based on a PDCCH candidate or a size that indicates additional information for the cell.

In aspect 51, the method of any of aspects 31-50 further includes that the PDCCH message comprises first DCI comprising the additional broadcast information and a second DCI comprising the information scheduling the SIB1 PDSCH.

In aspect 52, the method of any of aspects 31-51 further includes that the UE receives the first DCI and the second DCI in a same CORESET.

In aspect 53, the method of any of aspects 31-52 further includes that the first DCI and the second DCI are based on a same RNTI.

In aspect 54, the method of any of aspects 31-53 further includes that the first DCI is based on a different RNTI than the second DCI.

In aspect 55, the method of any of aspects 31-54 further includes that one or more of the first DCI or the second DCI comprise a location or a format that is defined.

In aspect 56, the method of any of aspects 31-55 further comprises: performing blind detection for the first DCI and the second DCI based on multiple bandwidth options.

In aspect 57, the method of any of aspects 31-56 further comprises: receiving an indication, in the synchronization signal, indicating at least one of a location or a format for one or more of the first DCI or the second DCI.

In aspect 58, the method of any of aspects 31-57 further includes that the combined block comprises a first SSB that the UE receives in a first SSB occasion, the first SSB comprising the information scheduling the SIB1 PDSCH and additional information, the method further comprises: receiving a second SSB in a second SSB occasion, the second SSB comprising the additional information without the information scheduling the SIB1 PDSCH.

In aspect 59, the method of any of aspects 31-58 further comprises: receiving an indication of a presence of one or more of the information scheduling the SIB1 PDSCH or the additional information for a corresponding SSB occasion.

In aspect 60, the method of any of aspects 31-59 further includes that the UE receives the indication in one or more of the synchronization signal or a DMRS comprised in the first SSB or the second SSB.

Aspect 61 is an apparatus for wireless communication including at least one processor coupled to a memory and configured to implement a method as in any of aspects 31 to 60.

Aspect 62 is an apparatus for wireless communication including means for implementing a method as in any of aspects 31 to 60.

Aspect 63 is a non-transitory computer-readable medium storing computer executable code, where the code when executed by a processor causes the processor to implement a method as in any of aspects 31 to 60.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a base station, comprising:
    transmitting a combined block comprising at least one synchronization signal and a single channel that includes scheduling information that indicates resources for a system information block 1 (SIB1) physical downlink shared channel (PDSCH), a system frame number (SFN) parameter, and beam index information, wherein the single channel includes a physical downlink control channel (PDCCH) that carries first downlink control information (DCI) and second DCI, wherein the first DCI includes barred cell information and the SFN parameter, and the second DCI includes the scheduling information that indicates the resources for the SIB1 PDSCH; and
    transmitting the SIB1 PDSCH based on the scheduling information.

2. The method of claim 1, further comprising:
    scrambling cyclic redundancy check (CRC) bits associated with the scheduling information for the SIB1 PDSCH based on a system information radio network temporary identifier (SI-RNTI).

3. The method of claim 1, wherein the at least one synchronization signal comprises a primary synchronization signal (PSS) and a secondary synchronization signal (SSS).

4. The method of claim 1, further comprising transmitting the PDCCH on a control resources set (CORESET) or a search space.

5. The method of claim 4, wherein the CORESET or the search space is dedicated for the PDCCH.

6. The method of claim 4, wherein the CORESET or the search space carries at least one additional control message.

7. The method of claim 1, wherein the first DCI is associated with a different PDCCH candidate for different beams or different cells.

8. The method of claim 1, wherein the first DCI has a different size for different beams or different cells.

9. The method of claim 1, further comprising: transmitting the first DCI and the second DCI in a same control resource set (CORESET).

10. The method of claim 1, wherein the first DCI is based on a different radio network temporary identifier (RNTI) than the second DCI.

11. The method of claim 1, wherein the combined block comprises a first synchronization signal block (SSB) that the base station transmits in a first SSB occasion, the first SSB comprising the scheduling information for the SIB1 PDSCH and additional information, the method further comprising:
    transmitting a second SSB in a second SSB occasion, the second SSB comprising the additional information without the scheduling information for the SIB1 PDSCH.

12. The method of claim 11, further comprising:
    transmitting an indication of a presence of one or more of the scheduling information for the SIB1 PDSCH in the combined block or the additional information for a corresponding SSB occasion.

13. The method of claim 1, wherein the combined block includes an intra frequency reselection parameter, a spare field, a half-frame bit parameter, an MSB of SSB index parameter, a frequency domain resource allocation (FDRA) field, a time domain resource allocation (TDRA) field, a modulation coding scheme (MCS) field, and a redundancy version (RV) parameter.

14. An apparatus for wireless communication at a base station, comprising:
    memory; and
    at least one processor coupled to the memory and configured to:
        transmit a combined block comprising at least one synchronization signal and a single channel that includes scheduling information that indicate resources for a system information block 1 (SIB1) physical downlink shared channel (PDSCH), a system frame number (SFN) parameter, and beam index information, wherein the single channel includes a physical downlink control channel (PDCCH) that carries first downlink control information (DCI) and second DCI, wherein the first DCI includes barred cell information and the SFN parameter, wherein the second DCI includes the scheduling information that indicates the resources for the SIB1 PDSCH; and
        transmit the SIB1 PDSCH based on the scheduling information.

15. A method of wireless communication at a user equipment (UE), comprising:
    receiving a combined block from a base station, the combined block comprising at least one synchronization signal and a single channel that includes scheduling information that indicates for a system information block 1 (SIB1) physical downlink shared channel (PDSCH), a system frame number (SFN) parameter, and beam index information, wherein the single channel includes a physical downlink control channel (PDCCH) that carries first downlink control information (DCI) and second DCI, wherein the first DCI includes barred cell information and the SFN parameter, wherein the second DCI includes the scheduling information that indicates for the SIB1 PDSCH; and
    receiving the SIB1 PDSCH based on the scheduling information.

16. The method of claim 15, further comprising:
    unscrambling cyclic redundancy check (CRC) bits associated with the scheduling information for the SIB1 PDSCH based on a system information radio network temporary identifier (SI-RNTI).

17. The method of claim 15, wherein the at least one synchronization signal comprises a primary synchronization signal (PSS) and a secondary synchronization signal (SSS).

18. The method of claim 15, further comprising:
    receiving the PDCCH on a control resources set (CORESET) or search space.

19. The method of claim 15, further comprising:
    receiving the first DCI and the second DCI in a same control resource set (CORESET).

20. The method of claim 15, wherein the first DCI and the second DCI are based on a same radio network temporary identifier (RNTI).

21. The method of claim 15, wherein the first DCI is based on a different radio network temporary identifier (RNTI) than the second DCI.

22. The method of claim 15, wherein the combined block comprises a first synchronization signal block (SSB) that the UE receives in a first SSB occasion, the first SSB comprising the scheduling information for the SIB1 PDSCH and additional information, the method further comprising:

receiving a second SSB in a second SSB occasion, the second SSB comprising the additional information without the scheduling information for the SIB1 PDSCH.

23. The method of claim 22, further comprising:
receiving an indication of a presence of one or more of the scheduling information for the SIB1 PDSCH or the additional information for a corresponding SSB occasion.

24. An apparatus for wireless communication at a user equipment (UE), comprising:
memory; and
at least one processor coupled to the memory and configured to:
receive a combined block from a base station, the combined block comprising at least one synchronization signal and a single channel that includes scheduling information that indicates resources for a system information block 1 (SIB1) physical downlink shared channel (PDSCH), a system frame number (SFN) parameter, and beam index information, wherein the single channel includes a physical downlink control channel (PDCCH) that carries first downlink control information (DCI) and second DCI, wherein the first DCI includes barred cell information and the SFN parameter, wherein the second DCI includes the scheduling information that indicates the resources for the SIB1 PDSCH; and
receive the SIB1 PDSCH based on the scheduling information.

* * * * *